(12) United States Patent
Todescato et al.

(10) Patent No.: US 10,474,857 B2
(45) Date of Patent: Nov. 12, 2019

(54) GESTURE CONTROLLABLE MACHINE-READABLE SYMBOL READER SYSTEMS AND METHODS, WITH HEAD WORN INTERFACE

(71) Applicant: Datalogic IP Tech, S.r.l., Bologna (IT)

(72) Inventors: Pietro Todescato, Eugene, OR (US); Davide Gavioli, San Vito di Spilamberto (IT); Mauro Pecorari, Porto Potenza Picena (IT); Moschini Roberto, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 15/847,710

(22) Filed: Dec. 19, 2017

(65) Prior Publication Data

US 2019/0188433 A1   Jun. 20, 2019

(51) Int. Cl.
*G06K 7/10* (2006.01)
(52) U.S. Cl.
CPC ....... *G06K 7/10722* (2013.01); *G06K 7/1091* (2013.01); *G06K 7/10891* (2013.01); *G06K 2007/10534* (2013.01)
(58) Field of Classification Search
None
See application file for complete search history.

(56) References Cited

U.S. PATENT DOCUMENTS

| | | | |
|---|---|---|---|
| 5,969,321 A * | 10/1999 | Danielson | G06K 7/10574 235/462.01 |
| 6,561,428 B2 | 5/2003 | Gerst et al. | |
| 8,490,877 B2 | 7/2013 | Kearney | |
| 9,092,684 B1 | 7/2015 | Sundaram et al. | |
| 9,349,047 B2 | 5/2016 | Fiorini et al. | |
| 2013/0169536 A1 | 7/2013 | Wexler et al. | |
| 2015/0074616 A1 | 3/2015 | Hokyung et al. | |
| 2015/0278570 A1 * | 10/2015 | Van Horn | H01Q 1/2283 235/472.01 |
| 2016/0259958 A1 | 9/2016 | Nara et al. | |
| 2017/0103440 A1 | 4/2017 | Xing et al. | |

FOREIGN PATENT DOCUMENTS

| | | |
|---|---|---|
| KR | 101502085 B1 | 3/2015 |
| KR | 20150062182 A | 6/2015 |

OTHER PUBLICATIONS

International Search Report and Written Opinion of the International Searching Authority, issued in corresponding International Application No. PCT/US2018/066326, filed Dec. 18, 2018, 9 pages.

* cited by examiner

*Primary Examiner* — Kristy A Haupt
(74) *Attorney, Agent, or Firm* — Cozen O'Connor

(57) ABSTRACT

Systems and methods for capturing machine-readable symbols using a finger mounted indicia. The system includes an image sensor that captures a plurality of images from the field of view of the image sensor. An occurrence of a gesture is detected in the plurality of images, in which the gesture is represented by a trace of a number of movements of a finger mounted indicia. In response to detecting the occurrence of the gesture, an at least attempt is triggered to decode one or more machine-readable symbols represented in the images. The gesture may be used to indicate a region of interest that includes the machine-readable symbol. Such indication may improve the efficiency and processing time needed to detect and decode a machine-readable symbol.

20 Claims, 16 Drawing Sheets

GESTURE CONTROLLABLE MACHINE-READABLE SYMBOL READER SYSTEMS AND METHODS, WITH HEAD WORN INTERFACE

BACKGROUND

Technical Field

The present disclosure relates to automatic data collection, including machine-readable symbol readers, with a head worn interface, that detect and decode machine-readable symbols, including machine-readable symbols borne by objects within an environment surrounding a user.

Description of the Related Art

There are numerous examples of machine-readable symbol readers in use in a variety of environments, for example in retail, warehouse and logistics environments. These machine-readable symbol readers are used to read various types of machine-readable symbols carried by, inscribed on, or otherwise borne by various types of items or objects, or even humans and other animals. The machine-readable symbols typically take the form of either one-dimensional machine-readable symbols (e.g., barcode symbols) or two-dimensional machine-readable symbols (e.g., area or matrix code symbols). Machine-readable symbols are based on machine-readable symbologies (e.g., Code 39, Code 128, EAN13, Code 93, DataMatrix, PDF 417, QR Code) which define respective mappings between areas of high and low reflectance and human understandable characters (e.g., alphanumeric, extended ASCII).

Many machine-readable symbol readers are hand-held by an operator during use. These hand-held machine-readable symbol readers are typically gripped in the hand of the operator and aimed at an object or a machine-readable symbol carried by an object. Hand-held machine-readable symbol readers typically rely on a portable power source to operate, for example rechargeable or secondary battery cells. In order to reduce power consumption, hand-held machine-readable symbol readers typically have a trigger which the operator selectively actuates (e.g., depresses or pulls) to cause the hand-held machine-readable symbol reader to scan or capture an image of a region in a field-of-view of the hand-held machine-readable symbol reader. The scanning or image capture results in a representation of the field-of-view. The hand-held machine-readable symbol reader then attempts to identify machine-readable symbols in the representation, and optionally decode those identified machine-readable symbols. Many hand-held machine-readable symbol readers are capable of recognizing and decoding machine-readable symbols from two or more different symbologies.

Conventional hand-held machine-readable symbol readers occupy at least one of an operator's hands, and may be bulky and difficult to use. In addition, the conventional machine-readable symbol readers may operate inefficiently, such as, for example, by scanning or capturing images that contain significantly more of the surrounding environment (e.g., area) than the machine-readable symbol to be detected and decoded.

BRIEF SUMMARY

Wearable image sensors may be used to scan or capture machine-readable symbols within the environment surrounding a user. In some implementations, the wearable image sensors may be mounted on a helmet, headband, goggles, or eyeglass frame that may be worn on the head of a user. As such, the portion of the environment captured by the wearable image sensor may be changed by moving the head of the user. In such instances, a need may arise to improve the power consumption efficiency of operation of the machine-readable symbol reader, analogous in some respects to the addition of the trigger to hand-held machine-readable symbol readers. In such instances, a need may additionally or alternatively arise to improve a computational efficiency of operation of the machine-readable symbol reader, analogous in some respects to the addition of an aiming beam to hand-held machine-readable symbol readers. To do so, the machine-readable symbol reader may advantageously detect a finger mounted indicia worn by an operator and that may be used to control operation of the head worn image sensor, and/or to indicate and/or delineate the machine-readable symbol to be captured.

A system that reads machine-readable symbols may be summarized as including: at least one wearable image sensor having a field of view, the field of view moveable to selectively encompass respective portions of an environment with movement of the at least image sensor, the at least one image sensor which in operation captures images of the respective portions of the environment within the field of view of the at least one image sensor; a control system that is communicatively coupled to the at least one image sensor to receive signals representative of the images, the control system which: detects an occurrence of a first gesture in the images, the first gesture represented by a trace of a number of movements of a first finger mounted indicia; and in response to detection of the occurrence of the first gesture, triggers an at least attempt at decoding one or more machine-readable symbols represented in the images. In some implementations, each of one or more combinations of gestures involving one or both of a first finger mounted indicia and a second finger mounted indicia may be used to trigger a defined function, operation, and/or application, or even additional finger mounted indicia on fingers of one or two hands. As such, the first finger mounted indicia may be located on a first finger, and the second finger mounted indicia may be mounted on a second finger in which the second finger may be on the same or on the opposite hand as the first finger. In some implementations, a combination of gestures or positions by both the first finger mounted indicia and the second finger mounted indicia may be used to trigger a defined function, operation, and/or application.

The control system may include a first processor and at least a second processor, the first processor having a lower rated power consumption than a rated power consumption of the second processor, and wherein to trigger an at least attempt at decoding one or more machine-readable symbols represented in the images the first processor may provide an activation signal to activate the second processor. To activate the second processor, the first processor may provide a wake signal that wakes the second processor from a relative lower power state to a relatively higher power state. The at least one image sensor may include a first image sensor and a second image sensor, the first image sensor having a lower rated power consumption than a rated power consumption of the second processor, and to trigger an at least attempt at decoding one or more machine-readable symbols represented in the images the first processor may provide a signal that activates the second image sensor to capture images of the portion of the environment. A respective field of view of the second image sensor may be co-extensive with a respective field of view of the first image sensor. The system may further include: at least one light source, and wherein in response to detection of the occurrence of the first gesture, the control system may cause the at least one light source to emit illumination. In triggering an at least attempt at decoding the control system may trigger a transition from a relatively lower power consumption state to a relatively higher power consumption state, and after an attempted decode the control system may trigger a return to the relatively lower power state. The control system may include at least one processor and at least one non-transitory processor-readable storage medium that stores at least one of processor-executable instructions or data that, when executed by the at least one processor, cause the at least one processor to: detect the first finger mounted indicia in the images and determine a shape of the trace of the first finger mounted indicia in the images. The first finger mounted indicia may be a first finger mounted machine-readable symbol, and the at least one of processor-executable instructions or data, when executed by the at least one processor, may cause the at least one processor to: detect the first finger mounted machine-readable symbol in the images. The first finger mounted indicia may be a first finger mounted one-dimensional machine-readable symbol, and the at least one of processor-executable instructions or data, when executed by the at least one processor, may cause the at least one processor to: detect the first finger mounted one-dimensional machine-readable symbol in the images. There may be at least one object in the environment which bears at least one two-dimensional machine-readable symbol, and the at least one of processor-executable instructions or data, when executed by the at least one processor, may cause the at least one processor to: attempt to decode the object-borne two-dimensional machine-readable symbol in the images. The at least one of processor-executable instructions or data, when executed by the at least one processor, may cause the at least one processor to detect an amount of skew along a longitudinal axis of the first finger mounted one-dimensional machine-readable symbol in the images. The first finger mounted indicia may be a first finger mounted non-perceptible digital watermark that is not perceptible by a human, and the at least one of processor-executable instructions or data, when executed by the at least one processor, may cause the at least one processor to: detect the first finger mounted non-perceptible digital watermark in the images. The first finger mounted indicia may be at least a first finger mounted light source or at least a first finger mounted retro-reflector, and the at least one of processor-executable instructions or data, when executed by the at least one processor, may cause the at least one processor to: detect the first finger mounted light source or the first finger mounted retro-reflector in the images. The first finger mounted indicia may be at least a first finger mounted indicia that does not encode information, and the at least one of processor-executable instructions or data, when executed by the at least one processor, may cause the at least one processor to: detect the first finger mounted indicia that does not encode information in the images. The at least one of processor-executable instructions or data, when executed by the at least one processor, may cause the at least one processor to: determine which of a plurality of defined functions is indicated by the gesture based at least in part on the determined shape of the trace of the first finger mounted indicia in the images. The at least one of processor-executable instructions or data, when executed by the at least one processor, may cause the at least one processor to execute respective ones of each of a plurality of defined functions in response to successive ones of a plurality of gestures detected in the images. The system may further include a hand wearable element that bears the first finger mounted indicia. The hand wearable element may be a glove that includes a base and at least one finger portion, the at least one finger portion which extends outwardly from the base and which is sized and shaped to at least partially surround a human finger, the first finger mounted indicia borne on the finger portion of the glove. The at least one image sensor may be carried by an augmented reality headset wearable by an operator of the system and the first finger mounted indicia may be carried by a finger of the operator of the system. The control system may further: in response to detection of the occurrence of the first gesture, search a region of interest for one or more machine-readable symbols, the region of interest which is within the field of view of the at least one wearable image sensor.

A method of operation of a system that reads machine-readable symbols, the system which includes at least one wearable image sensor having a field of view, the at least one image sensor which in operation captures images of an environment, may be summarized as including: capturing by the at least one image sensor a plurality of images of the respective portions of the environment within the field of view of the image sensor; detecting by at least one processor an occurrence of a first gesture in the plurality of images, the first gesture represented by a trace of a number of movements of a first finger mounted indicia; and in response to detecting the occurrence of the first gesture, triggering an at least attempt by the at least one processor to decode one or more machine-readable symbols represented in the images.

The at least one processor may include a first processor and a second processor, the first processor having a lower rated power consumption than a rated power consumption of the second processor, and the method may further include: generating an activation signal by the first processor; and transmitting the activation signal to the second processor to activate the second processor. Transmitting the activation signal by the first processor may further include transmitting a wake signal that wakes the second processor from a relatively lower power state to a relatively higher power state. The at least one image sensor may include a first image sensor and a second image sensor, the first image sensor having a lower rated power consumption than a rated power consumption of the second processor, and the method may further include: transmitting an activation signal to the second image sensor to capture images of the portion of the environment. The system may include at least one light source, and the method may further include: in response to detecting the occurrence of the first gesture, transmitting one or more signals that cause the at least one light source to emit illumination. Triggering an at least attempt by the at least one processor to decode may include triggering a transition from a relatively lower power consumption state to a relatively higher power consumption state, and after the at least attempt to decode, triggering a return to the relatively lower power state. The method may further include: detecting the first finger mounted indicia in at least one of the plurality of images. The finger mounted indicia may include a first finger mounted machine-readable symbol, and detecting the first finger mounted indicia may further include detecting the first finger mounted machine-readable symbol in at least one of the plurality of images. The finger mounted indicia may include a first finger mounted one-dimensional machine-readable symbol, and detecting the first finger mounted indicia may further include detecting the first finger mounted one-dimensional machine-readable symbol in at least one of the plurality of images. There may be at least one object in the environment which bears at least one two-dimensional machine-readable symbol, and triggering an at least attempt by the at least one processor to decode further may further include triggering an attempt to decode the object-borne two-dimensional machine-readable symbol in the plurality of images. The method may further include: detecting by the at least one processor an amount of skew along a longitudinal axis of the first finger mounted one-dimensional machine-readable symbol in the images. The finger mounted indicia may include a first finger mounted non-perceptible digital watermark that is not perceptible by a human, and detecting the first finger mounted indicia may further include detecting the first finger mounted non-perceptible digital watermark in at least one of the plurality of images. The finger mounted indicia may include at least a first finger mounted light source or at least a first finger mounted retro-reflector, and detecting the first finger mounted indicia may further include detecting the at least a first finger mounted light source or the at least a first finger mounted retro-reflector in at least one of the plurality of images. The finger mounted indicia may include a first finger mounted indicia that does not encode information, and detecting the first finger mounted indicia may further include detecting the first finger mounted indicia that does not encode information in at least one of the plurality of images. The method may further include: determining which of a plurality of defined functions is indicated by the first gesture based at least in part on the determined shape of the trace of the first finger mounted indicia in the plurality of images. The method may further include: executing respective ones of each of a plurality of defined functions in response to successive ones of a plurality of gestures detected in the plurality of images. A hand wearable element may bear the first finger mounted indicia, and detecting by at least one processor an occurrence of a first gesture may further include detecting by the at least one processor an occurrence of the first gesture in the plurality of images, the first gesture represented by a trace of a number of movements of the first finger mounted indicia which is mounted on the hand wearable element. The hand wearable element may be a glove that includes a base and at least one finger portion, the at least one finger portion which extends outwardly from the base and which is sized and shaped to at least partially surround a human finger, the first finger mounted indicia borne on the finger portion of the glove, and detecting by at least one processor an occurrence of a first gesture may further include detecting by the at least one processor an occurrence of the first gesture in the plurality of images, the first gesture represented by a trace of a number of movements of the first finger mounted indicia borne on the finger portion of the glove. The method may further include: in response to detecting the occurrence of the first gesture, searching a region of interest for one or more machine-readable symbols, the region of interest which is within the field of view of the at least one wearable image sensor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
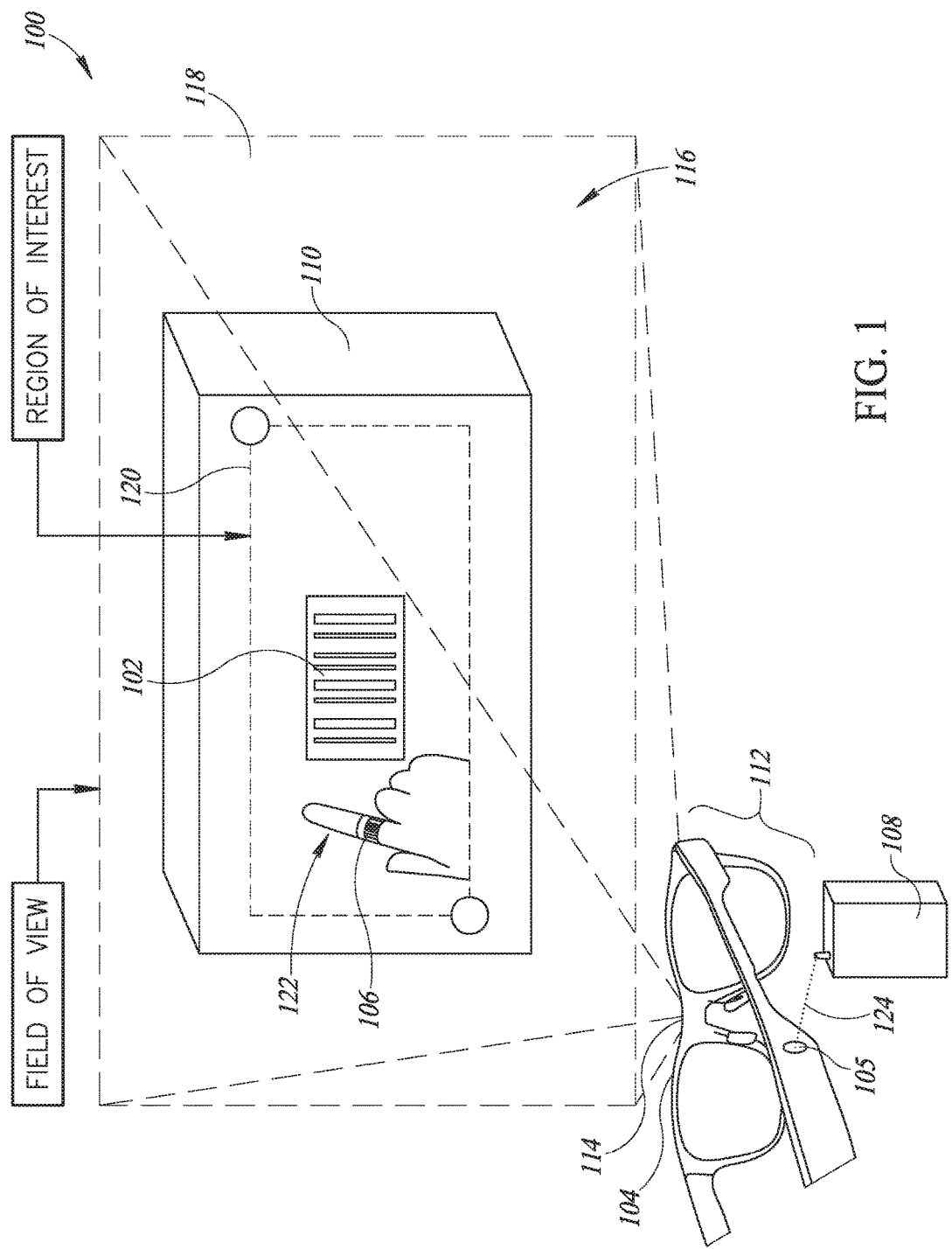
FIG. 1 is a schematic diagram of a system that captures and attempts to decode machine-readable symbols in which the system includes a wearable image sensor and a finger mounted indicia, according to at least one illustrated implementation.

FIG. 1 shows a system 100 that detects and attempts to decode machine-readable symbols, such as a machine-readable symbol 102, in which the system 100 includes a wearable image sensor 104, a finger mounted indicia 106, and a control system 108, according to at least one illustrated implementation. The machine-readable symbol 102 may be a symbol that is attached to, printed on, inscribed, or otherwise borne along a surface of an object 110. Such machine-readable symbols 102 may include, for example, machine-readable symbols 102 that are printed directly on the surface of the object 110 and machine-readable symbols 102 that are printed onto a label that is physically attached to the object 110. In some implementations, the machine-readable symbol 102 may include one-dimensional machine-readable symbols (e.g., barcode symbols) and/or two-dimensional machine-readable symbols (e.g., Quick Response symbols). In some implementations, the machine-readable symbol 102 may include symbols that are not perceptible to humans but may be detected and decoded by the wearable image sensor 104 and/or control system 108. Such symbols may include, for example, digital watermarks.

The wearable image sensor 104 may be comprised of a wearable article 112 and at least one image sensor 114. Such a wearable article 112 may include any articles of clothing or other objects that may be wearable by a user. In some implementations, the wearable article 112 may include, for example, a pair of glasses or eyeglass frame, a helmet, a set of goggles, a hat, a visor, a headband, a vest, and/or a belt. The at least one image sensor 114 may capture an electronic representation of an image in which the image is comprised of a portion of a surrounding environment 116. Such an electronic representation may be made, for example, by a set of transducers that convert light waves into electrical signals. The at least one image sensor 114 may be oriented along the wearable article 112 such that a field of view 118 of the at least one image sensor 114 is directed towards a portion of the surrounding environment 116 that a user faces when the user is wearing the wearable image sensor 104. In some implementations, the at least one image sensor 114 may be operable to capture one or more images of a machine-readable symbol 102 that is within the field of view 118 of the at least one image sensor 114. In such an implementation, the field of view 118 of the wearable image sensor 104 may be movable to selectively encompass various portions of the environment 116 surrounding the user, such as may occur, for example, when a head of the user moves when the wearable image sensor 104 is mounted on the head of the user. As discussed below, in some implementations, the capture of the image(s) of the machine-readable symbol 102 by the at least one image sensor 114 may be activated and/or facilitated by one or more movements involving the finger mounted indicia 106. In some implementations, the wearable image sensor may include a wireless communications module 105 that may be used to communicatively couple the wearable image sensor 104 with other devices via one or more wireless communications protocols, such as Bluetooth, WiFi, ZigBee, or other similar wireless protocols.

The finger mounted indicia 106 may include one or more markings, symbols, or other indications that can be detected by the at least one image sensor 114. In some implementations, such detection of the finger mounted indicia 106 by the at least one image sensor 114 may be used to facilitate the detection and capture of images of one or more machine-readable symbols 102 within the environment 116 surrounding the user. For example, in some implementations, a gesture involving the finger mounted indicia 106 may be used to define a region of interest 120 in which a machine-readable symbol 102 is located. In some implementations, the gesture may include positioning the finger-mounted indicia 106 within a location that may be detected by the image sensor 114. In some implementations, the gesture may include one or more movements involving the finger-mounted indicia 106 that may be detected by the image sensor 114. As such, the at least one image sensor 114 may capture an image of the region of interest 120 instead of the entire field of view 118. Such a region of interest 120 may be included within and may be smaller than the field of view 118 of the at least one imager, thereby reducing the size of the image to be captured by the at least one image sensor 114 and reducing the amount of processing necessary to capture, detect, and/or decode the machine-readable symbol 102. In some implementations, the finger mounted indicia 106 may be comprised of an electronic ink display that may provide for high visibility and contrast between the finger mounted indicia 106 and a background, such as may be provided by a glove or a hand of the user. Such may advantageously use no or little power once a presentation on the electronic ink display has been updated. In such an implementation, the electronic ink may be used to modify the finger-mounted indicia 106 that is displayed. Such modification may be based, for example, upon input that may be received from a user actuatable component, such as push button that may be communicatively coupled with the finger-mounted indicia 106. In some implementations, such user input may be received via a wireless transmission that may be received by a component that is communicatively coupled to the finger-mounted indicia 106. The finger mounted indicia 106 may take various forms. For example, in some implementations, the finger mounted indicia 106 may include one or more machine-readable symbols that may be borne along the surface of a hand wearable element 122, such as a ring, band or article of clothing (e.g., a glove), for example, that might surround at least a portion of a finger of a user. Such machine-readable symbols may be used to encode information that may be useful to the system 100, such as a location in which the finger mounted indicia 106 is used or the identity of the person associated with and likely to use the finger mounted indicia 106. In some implementations, the finger mounted indicia 106 may be a symbol that does not encode any information. In such an implementation, the finger mounted indicia 106 may be comprised of one or more parts to facilitate detection by the at least one image sensor 114, such as, for example, through the execution of a pattern matching algorithm. Alternatively, such a symbol may be a logo or other symbol associated with an actual or potential customer to enhance the aesthetics for that customer of the object or article of clothing that bears the finger mounted indicia 106. In some implementations, the finger mounted indicia 106 may include a light source, such as, for example, a light source that emits light of a certain wavelength in the visible and/or non-visible spectrum of light.

The hand wearable element 122 that bears the finger mounted indicia 106 may surround at least a portion of one or more fingers of the user. In some implementations, the hand wearable element 122 may be a metal or cloth ring or elasticated band that may be slipped onto one or more fingers of the user. As such, the ring or band may include the finger mounted indicia 106 on at least a portion of the ring or band that faces in an opposite direction from the palm. In some implementations, the finger mounted indicia 106 may be repeated multiple times around the outside surface of the ring or band such that at least one of the finger mounted indicia 106 may face in the opposite direction from the palm regardless of how the ring or band is put onto the finger.

In some implementations, the hand wearable element 122 that bears the finger mounted indicia 106 may be a glove or other article that is designed to fit over the hand of the user. As such, the hand wearable element 122 may include a full glove with five enclosed fingers or a fingerless glove in which one or more fingertips have been removed. In such an implementation, the outer surface of one or more fingers of the glove may bear the finger mounted indicia 106. As such, the finger mounted indicia 106 may be oriented to face away from the palm of the user. In such an implementation, the color, texture, and/or other features of the glove may be modified to enhance the detectability of the finger mounted indicia 106. For example, in some implementations, the glove and the finger mounted indicia 106 may have a high color contrast, such as may occur when the glove is black or dark blue, and the finger mounted indicia 106 is white. The glove may be comprised of a variety of material, including rubber, leather, cloth, latex, nitile, and vinyl. In some implementations, such gloves or other articles of clothing that bear the finger mounted indicia 106 may be comprised of relatively inexpensive materials such that the gloves or other articles may be disposed after one or a small number of uses.

The control system 108 may take the form of any current or future developed processor-enabled device capable of executing one or more instruction sets. The control system 108 may be communicatively coupled with the wearable image sensor 104 and at least one image sensor 114, and may thereby receive one or more signals from the at least one image sensor representative of the images captured by the at least one image sensor. The control system 108 may include one or more processing units to execute one or more processor-readable instructions, instruction sets, or instruction blocks. The control system 108 may include a system memory to store one or more processor-readable instructions, instruction sets, or instruction blocks to be executed by the processor. Such processor-readable instructions, instruction sets, or instruction blocks may be used to capture one or more images using the wearable image sensor 104, detect positions or movements of the finger mounted indicia 106, and/or attempt to decode one or more machine-readable symbols 102 contained within the captured images. In some implementations, the processor-readable instructions, instruction sets, or instruction blocks may control the operation of various subsystems or components on the system 100. In some implementation, the control system 108 may be an off-board processor-enabled device that is communicatively coupled with the wearable image sensor 104 and at least one image sensor 114 via a communications link 124 using one or more wireless and/or wired communications protocols, such as, for example, Wi-Fi, Ethernet, Bluetooth, ZigBee or any other acceptable communication protocol. In some implementations, the control system 108 may be incorporated into the wearable article 112.

FIGS. 2A, 2B, 2C, and 2D show different implementations of a glove 200 that includes various types of finger mounted indicia 106, according to at least one illustrated implementation. The glove 200 may include a base 202 and one or more finger portions 204. The base 202 may be located proximate the palm of the user and may extend partially or completely around the palm and/or wrist of the user. The finger portions 204 may extend outwardly from the base 202. Each finger portion 204 may be sized and shaped to completely or partially surround a respective one of the fingers of the user. In some implementations, for example, the glove 200 may be fingerless such that the distal ends of one or more of the finger portions 204 may be missing. The finger mounted indicia 106 may be located along one or more of the finger portions 204 of the each implementation of the glove 200. As shown in FIGS. 2A through 2D, the finger mounted indicia 106 is borne along a surface of the finger portion 204 of the glove 200 associated with the index finger on the left hand of the user, with the finger mounted indicia 106 being located on the finger portion 204 relatively towards the base 202 of the glove and opposite the palm (e.g., proximate a part of the finger portion 204 corresponding to the knuckle of the user).

Figure 2B:
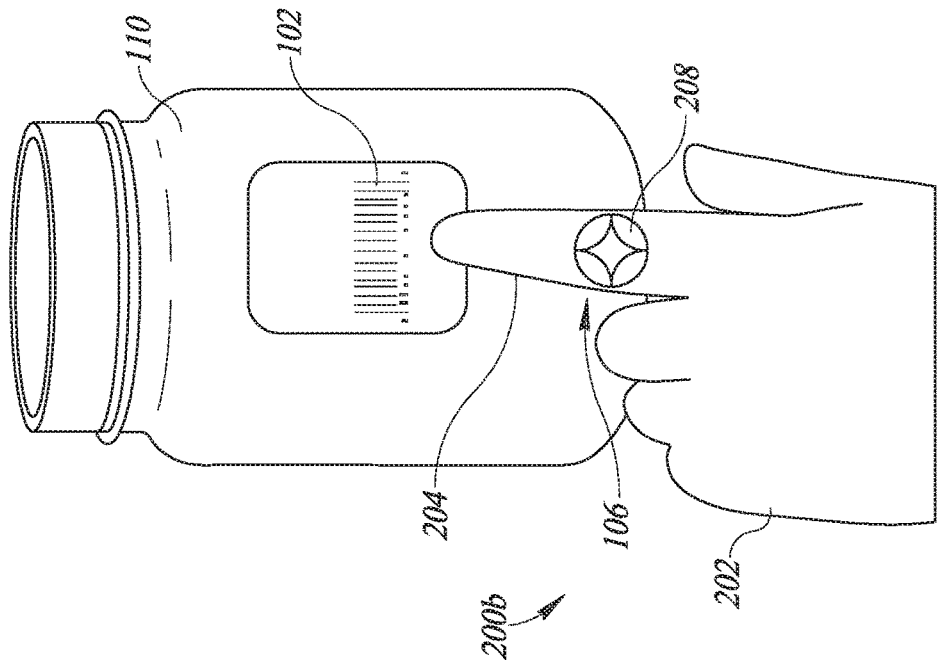
FIG. 2B is a schematic diagram of a glove that includes a finger mounted indicia that is comprised of a symbol that does not encode information, according to at least one illustrated implementation.
Figure 2A:
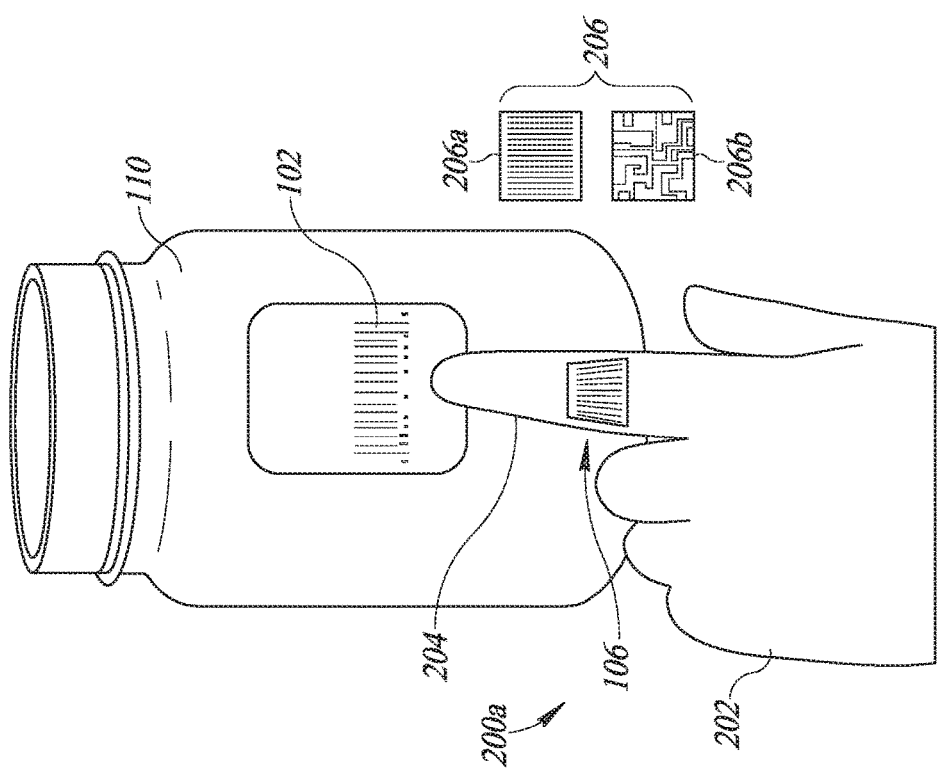
FIG. 2A is a schematic diagram of a glove that includes a finger mounted indicia that is comprised of a machine-readable symbol, according to at least one illustrated implementation.

FIG. 2A shows an implementation of a glove 200a in which the finger mounted indicia 106 is comprised of a finger-mounted machine-readable symbol 206. Such a finger-mounted machine-readable symbol 206 may be a finger-mounted one-dimensional machine-readable symbol 206a (e.g., a barcode symbol) and/or a finger-mounted two-dimensional machine-readable symbol 206b (e.g., a Quick Response symbol). As such, the machine-readable symbol may be used to encode various types of information that may be of use to the system. Such information may include, for example, identification information of a person (e.g., an employee identification number) associated with the glove 200a, location information associated with a location that the glove is to be used. In such an implementation, the control system 108 may use well-known, robust, and reliable decoding libraries for the finger mounted machine-readable symbols 206 that may improve the detectability of such finger mounted machine-readable symbols 206 in the images captured by the wearable image sensor 104.

FIG. 2B shows an implementation of a glove 200b in which the finger mounted indicia 106 is comprised of an indicia 208 that does not encode information. Such an indicia 208 may be comprised of a simple symbol in which the shape and/or color of the indicia 208 may provide a high contrast with the remaining portion of the glove 200b. In such an implementation, the control system 108 may use well-known pattern matching processes to detect the indicia 208 in the images captured by the wearable image sensor 104. In some implementations, the indicia 208 may be a logo or other symbol associated with a current or potential customer that may be purchasing the gloves 200b. In such an implementation, the use of such a logo or other symbol associated with the customer may improve the aesthetic appeal and/or marketability of the gloves 200b.

Figure 2D:
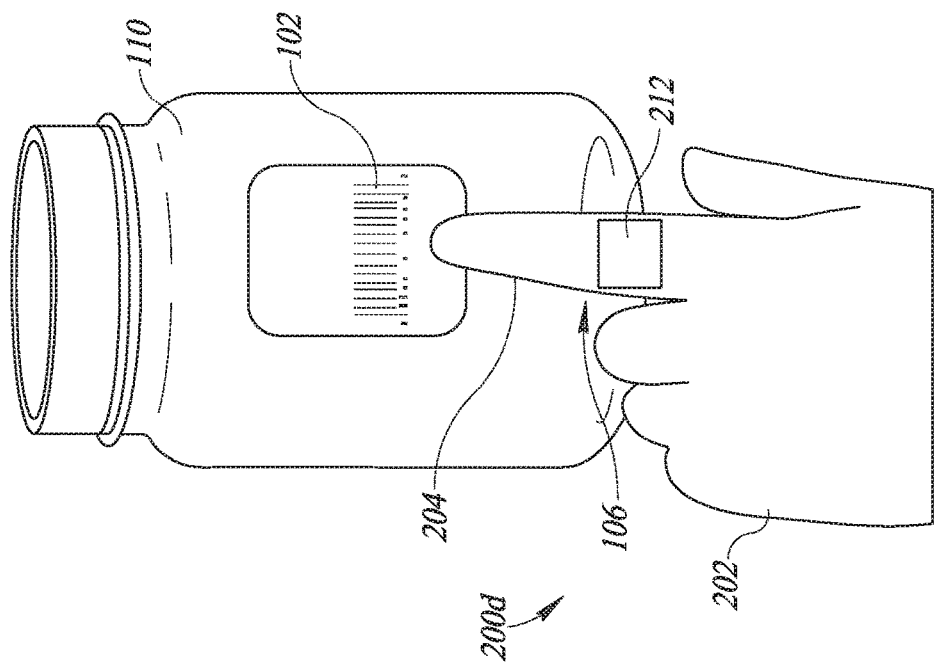
FIG. 2D is a schematic diagram of a glove that includes a finger mounted indicia that is comprised of a digital watermark, according to at least one illustrated implementation.
Figure 2C:
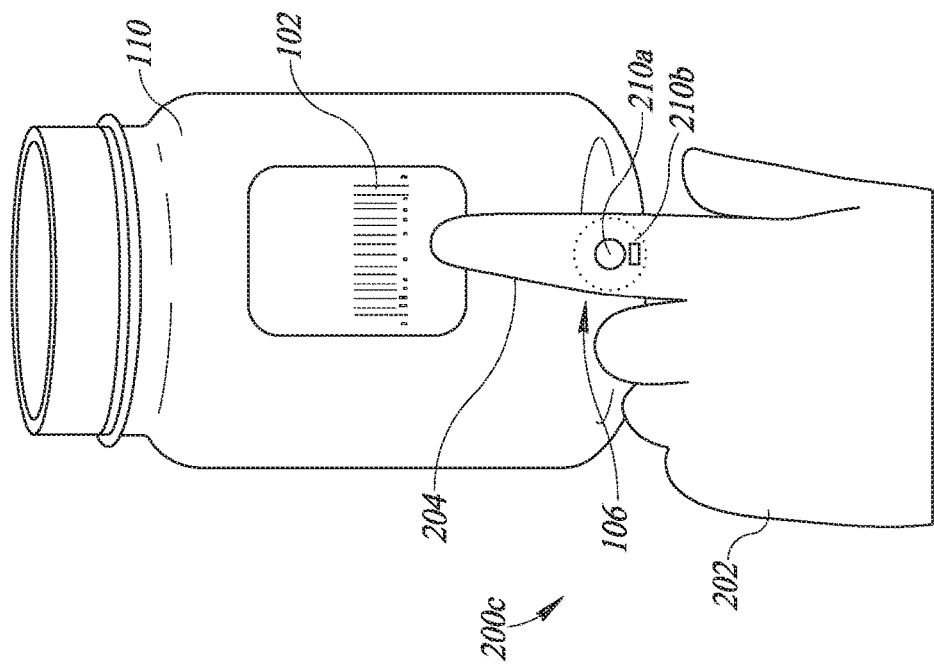
FIG. 2C is a schematic diagram of a glove that includes a finger mounted indicia that is comprised of one of a finger mounted light source and a finger mounted retro-reflector, according to at least one illustrated implementation.

FIG. 2C shows an implementation of a glove 200c in which the finger mounted indicia 106 is comprised of at least one of a finger mounted light source 210a and a finger mounted retro-reflector 210b, according to at least one illustrated implementation. Each of the finger mounted light source 210a and the finger mounted retro-reflector 210b may provide a luminous spot that may be detectable by the control system 108 in the images captured by the wearable image sensor 104. Such an implementation may be advantageous, for example, in situations in which the environment 116 surrounding the user has little or no light. The finger mounted light source 210a may include a light emitting diode (LED) that may produce a luminous spot that may use less power than other light sources. In some implementations, the LED may emit light of one or more specific wavelengths, which may be used to facilitate the detection the LED by the control system 108. Such light may have wavelengths that are within the visible light spectrum and/or that are outside of the visible light spectrum (e.g., infrared light). The finger mounted retro-reflector 210b may be comprised of a reflective surface that reflects light back towards a light source with minimal scattering. Such a light source may be included or incorporated into, for example, the wearable article 112 that is part of the wearable image sensor 104. In such an implementation, the light source may be located proximate the at least one image sensor 114.

FIG. 2D shows an implementation of a glove 200d in which the finger mounted indicia 106 is comprised of finger mounted non-perceptible digital watermark 212, according to at least one illustrated implementation. In such an implementation the finger mounted non-perceptible digital watermark 212 may be imperceptible to a human user, but may nonetheless be detectable by the control system 108 in images captured by the at least one image sensor 114. As such, the use of the finger mounted non-perceptible digital watermark 212 may improve the aesthetic appeal of the glove 200d to customers.

Figure 3A:
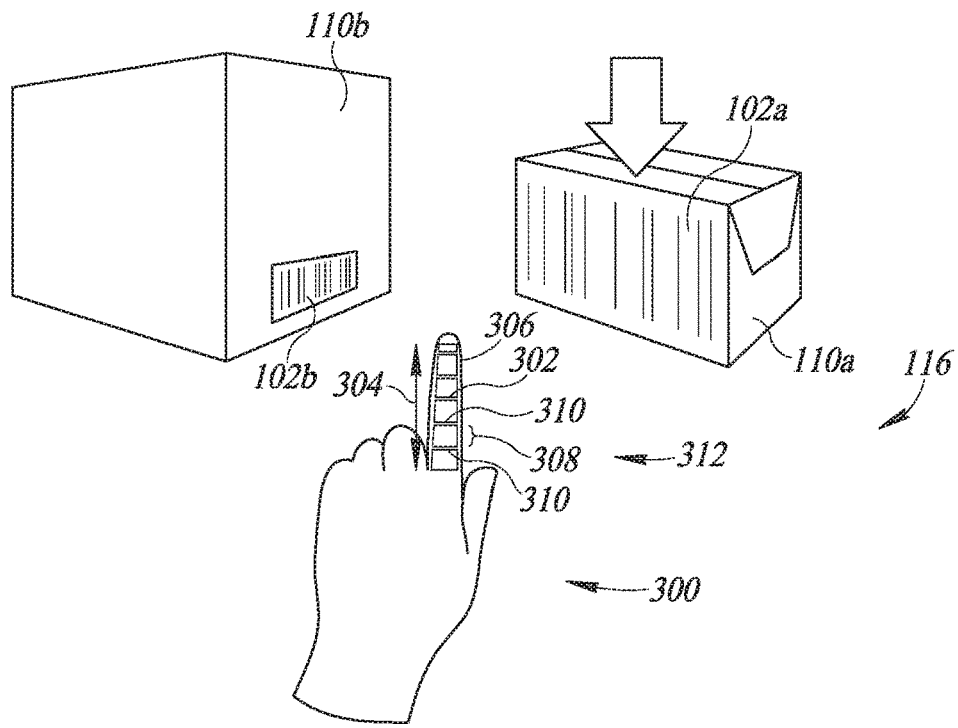
FIG. 3A is a schematic diagram in which a skew of a finger mounted indicia is determined and used to identify the machine-readable symbol on an object that is proximate the finger mounted indicia, according to at least one illustrated implementation.
Figure 3B:
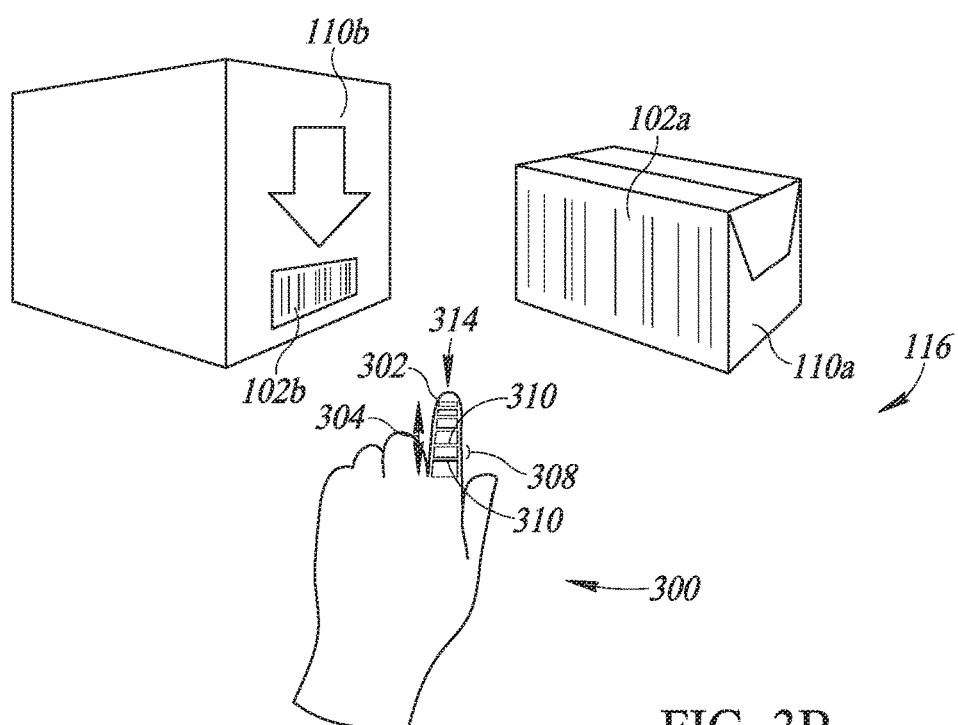
FIG. 3B is a schematic diagram in which a skew of a finger mounted indicia is determined and used to identify the machine-readable symbol on an object that is distal to the finger mounted indicia, according to at least one illustrated implementation.

FIGS. 3A and 3B show a glove 300 having a finger mounted indicia 106 comprised of a machine-readable barcode symbol 302 that is oriented along a longitudinal axis 304 of a finger portion 306 of the glove 300 in which the amount of skew of the machine-readable barcode symbol 302 is captured by the at least one image sensor 114 and detected by the control system 108. The control system 108 may use the detected amount of skew to specify one of a plurality of machine-readable symbols 102 (e.g., a first machine-readable symbol 102a, and a second machine-readable symbol 102b) within the environment 116 surrounding the user, according to at least one illustrated implementation. In some implementations, each of the plurality of machine-readable symbols 102 may be borne along the surface of respective objects 110 within the environment 116. As such, the first machine-readable symbol 102a may be borne along a surface of a proximal object 110a that is located relatively closer to the user, and the second machine-readable symbol 102b may be borne along a surface of a distal object 110b that is located relatively further away from the user.

The control system 108 may determine the amount skew of the machine-readable barcode symbol 302 based upon one or more perceived distances 308 between associated adjacent bars 310 in the machine-readable barcode symbol 302. For example, when the finger portion 306 of the glove 300 is in a relatively vertical direction a first amount of skew 312 may be perceived by the control system 108, and when the finger portion 306 of the glove 300 is in a relatively horizontal direction, a second amount of skew 314 may be perceived by the control system 108. In such situations, the perceived distance 308 between associated adjacent bars 310 may be relatively greater when the finger portion 306 is in a relatively vertical direction to create the first amount of skew 312 as compared to the same perceived distance 308 between the same associated adjacent bars 310 when the finger portion 306 is in a relatively horizontal direction to create the second amount of skew.

Each perceived amount of skew may be associated with a different function and/or a different object. For example, in some implementations, the control system 108 may detect and decode the first machine-readable symbol 102a on the proximal object 110a when the control system 108 detects the first amount of skew 312 (e.g., when the finger portion 306 is oriented in the relatively vertical direction), and the control system 108 may detect and decode the second machine-readable symbol 102b on the distal object 110b when the control system 108 detects the second amount of skew 314. In another situation, for example, in implementations in which the user is wearing an augmented or virtual reality headset (not shown), the relative amount of detected and determined skew may be used to control an amount of zooming capability provided by the augmented or virtual reality headsets. As such, the control system 108 may transmit one or more signals to cause the zoom function to zoom out when the control system 108 detects a first amount of skew 312, and the control system 108 may transmit one or more signals to cause the zoom function to zoom in when the control system 108 detects a second amount of skew 314. In some implementations, the detected and determined amount of skew may be used to control the functions of objects that are spaced apart from the user. For example, in some implementations, the relative amount of detected and determined skew may be used to control a speed and/or direction of a remotely controlled vehicle. As such, the control system 108 may transmit one or more signals to cause the remotely controlled vehicle may decelerate (or turn right) when the control system 108 detects a first amount of skew 312, and the control system 108 may transmit one or more signals to cause the remotely controlled vehicle may accelerate (or turn left) when the control system 108 detects a second amount of skew 314.

Figure 3C:
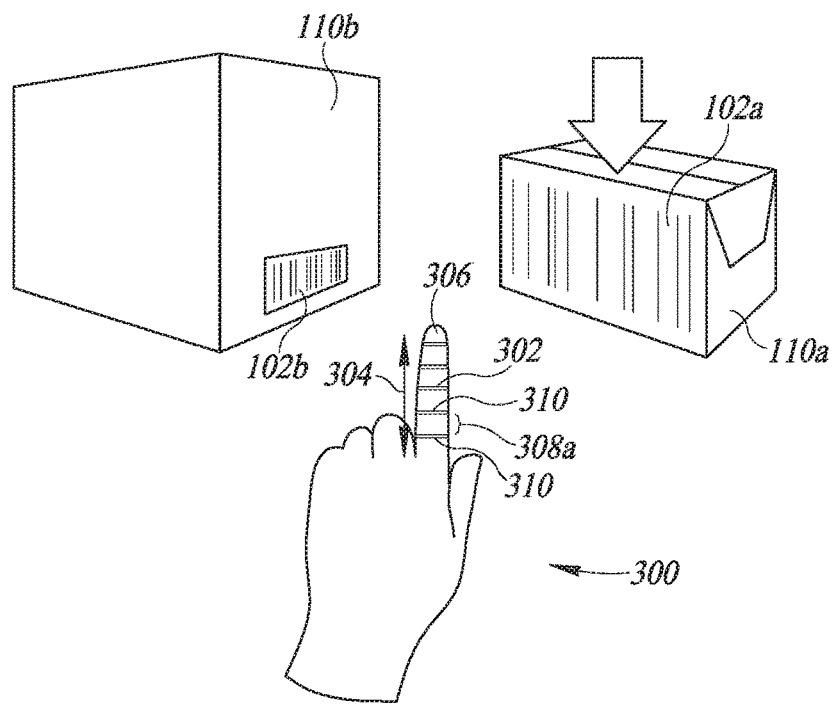
FIG. 3C is a schematic diagram in which a distance of a finger mounted indicia from an image sensor is determined and used to identify the machine-readable symbol on an object that is proximate the finger mounted indicia, according to at least one illustrated implementation.
Figure 3D:
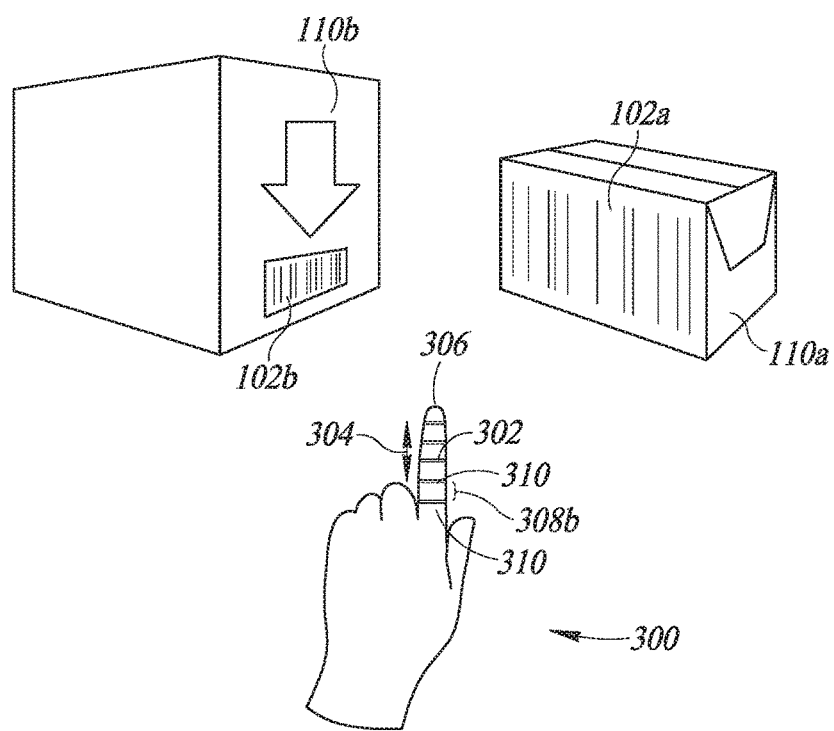
FIG. 3D is a schematic diagram in which a distance of a finger mounted indicia from an image sensor is determined and used to identify the machine-readable symbol on an object that is distal to the finger mounted indicia, according to at least one illustrated implementation.

FIGS. 3C and 3D show a glove 300 having a finger mounted indicia 106 comprised of a machine-readable barcode symbol 302 that is oriented along a longitudinal axis 304 of a finger portion 306 of the glove 300 in which the perceived distance between the finger mounted indicia 106 and the image sensor 114 is captured by the at least one image sensor 114 and detected by the control system 108. The control system 108 may use the detected distance to specify one of a plurality of machine-readable symbols 102 (e.g., a first machine-readable symbol 102a, and a second machine-readable symbol 102b) within the environment 116 surrounding the user, according to at least one illustrated implementation. As noted above, the first machine-readable symbol 102a may be borne along a surface of a proximal object 110a that is located relatively closer to the user, and the second machine-readable symbol 102b may be borne along a surface of a distal object 110b that is located relatively further away from the user.

The control system 108 may determine the distance between the image sensor 114 and the finger mounted indicia 106 based upon one or more perceived distances 308 between at least two bars 310 in the machine-readable barcode symbol 302. Such at least two bars 310 may include two adjacent bars 310 in the finger mounted indicia 106, a first bar and a last bar located at opposite ends of the finger mounted indicia 106, or any other set of bars 310 included in the finger mounted indicia. In such an implementation, the perceived distance 308 between the two bars 310 may be determined based upon the focal length, magnification factor, and field of view of the image sensor 114, along with the actual distance between the two bars 310. In such an implementation, the image sensor 114 may capture an image of the finger mounted indicia 106 at a defined magnification and focal length. Using such an image, the perceived distance between the two bars 310 in the finger mounted indicia in the captured image may be determined based upon the number of pixels that separate the two bars 310 in the image at the defined magnification ratio. The determined perceived distance between the two bars 310 may then be compared to the actual distance between the same two bars 310 to determine the distance between the image sensor 114 and the finger mounted indicia 106.

The control system 108 may use the determined perceived distances between at least two bars 310 on the finger mounted indicia 106 to determine a distance from the image sensor 114 and the finger mounted indicia 104. For example, when the finger portion 306 of the glove 300 is in a relatively proximal position to the image sensor 114, a first distance 308a may be perceived by the control system 108, and when the finger portion 306 of the glove 300 is in a relatively distal position to the image sensor 114, a second distance 308b may be perceived by the control system 108. In such situations, the perceived distance 308a between associated adjacent bars 310 may be relatively greater when the finger portion 306 is in a relatively proximal position with respect to the image sensor 114 as compared to the same perceived distance 308b between the same associated adjacent bars 310 when the finger portion 306 is in a relatively distal position with respect to the image sensor 114. In some implementations, the control system 108 may have stored information regarding the distance 308 between adjacent bars. In such an implementation, the control system 108 may determine a threshold value for the distance 308 that may be used to distinguish between a proximal position and a distal position for the finger mounted indicia 106. As noted above, each of the different perceived distances may be associated with a respective one of a different function and/or a different object.

Figure 4:
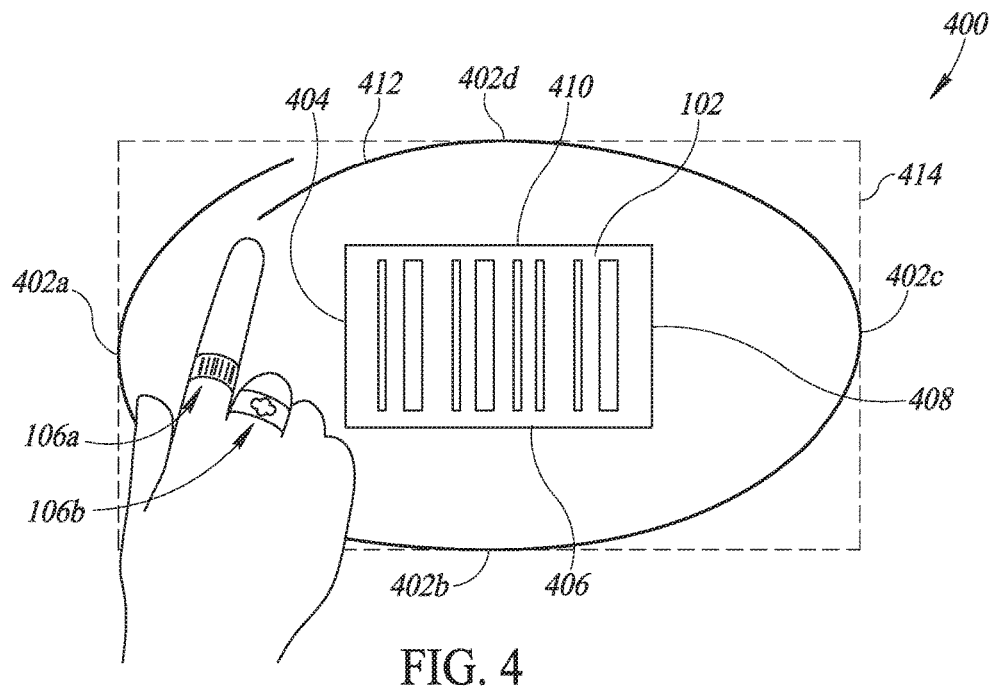
FIG. 4 is a schematic diagram of a gesture that is represented by a number of movements of a finger mounted indicia, according to at least one illustrated implementation.

FIG. 4 shows a gesture 400 that is represented by a number of movements 402a through 402d (collectively, movements 402) of a first finger mounted indicia 106a, according to at least one illustrated implementation. The movements 402 may be proximate the machine-readable symbol 102, which may have a left edge 404, a bottom edge 406, a right edge 408, and a top edge 410. The gesture 400 may begin with a first movement 402a in which the first finger mounted indicia 106a moves in a relatively downward direction proximate the left edge 404 of the machine-readable symbol 102. The first finger mounted indicia 106a may then be transitioned to a second movement 402b once the first finger mounted indicia 106a moves past the bottom edge 406 of the machine-readable symbol 102, at which point the first finger mounted indicia 106a is swept in a rightward direction proximate the bottom edge 406. The movements 402 may transition to a third movement 402c when the first finger mounted indicia 106a moves past the right edge 408 of the machine-readable symbol 102. At this point, the first finger mounted indicia 106a may begin to move in a relatively upward direction proximate the right edge 408 of the machine readable symbol 102. The movements 402 may transition to a fourth movement 402d when the first finger mounted indicia 106a moves past the top edge 410 of the machine-readable symbol 102, at which point the first finger mounted indicia 106a begins to move in a leftward direction proximate the top edge 410. The gesture 400 may end when the first finger mounted indicia 106a moves past the left edge 404 of the machine-readable symbol 102.

The control system 108 may detect an occurrence of the gesture 400 based upon the movement of the first finger mounted indicia 106a across a plurality of images captured by the at least one image sensor 114. In some implementations, the plurality of images may be comprised of successive images taken over a period of time during which the first finger mounted indicia 106a performs the gesture 400. By detecting the successive positions of the first finger mounted indicia 106a over successive images, the control system 108 may construct a trace 412 of the movements 402 by the first finger mounted indicia 106a. The control system 108 may identify the gesture 400 by comparing the constructed trace 412 with a set of possible traces stored, for example, in non-transitory memory in which each possible trace is associated with a different gesture. In such an implementation, each gesture may have an associated function or operation to be executed by the control system 108 when the control system 108 detects the respective gesture. For example, the gesture 400 may define a region of interest 414 in which the control system 108 may search for one or more machine-readable symbols 102. When the control system 108 detects an occurrence of the gesture 400, the control system 108 may attempt to detect and decode the one or more machine-readable symbols 102 included within the region of interest 414. Additional gestures may be associated with other functions, which may include, for example, adding a representation of an object 110 associated with a detected machine-readable symbol 102 to a virtual basket; removing a representation of an object 110 associated with a detected machine-readable symbol 102 from a virtual basket; requesting information regarding an object 110 associated with a detected machine-readable symbol 102; defining a remote host to transmit captured, detected, and/or decoded information; specifying a request for information regarding the object 110, such as nutritional information and/or expiration date(s) involving food items, and/or dimensions, weight, cost, hazardous materials information, and/or correct position within a warehouse facility; and/or an additional, separate gesture to identify a communication channel (e.g., Bluetooth, WiFi, ZigBee). Each of these functions may be associated with a separate gesture within the set of gestures. The set of gestures may be used to form a gesture recognition policy that may be executed by the control system 108. In some implementations, a gesture may include positioning the finger mounted indicia (e.g., the first finger mounted indicia 106a) within a location to be captured in images and detected by the control system 108.

In some implementations, a second finger mounted indicia 106b may be used instead of, or in conjunction with, the first finger mounted indicia 106a. Such a second finger mounted indicia 106b may be of the same type or of a different type (e.g., a machine-readable symbol, a watermark, or a non-encoded symbol) as the first finger mounted indicia 106a. In such an implementation, each of one or more combinations of gestures involving one or both of a first finger mounted indicia 106a and the second finger mounted indicia 106b may be used to trigger a defined function, operation, and/or application. As such, the first finger mounted indicia 106a may be located on a first finger, and the second finger mounted indicia 106b may be mounted on a second finger in which the second finger may be on the same or on the opposite hand as the first finger. In some implementations, a combination of gestures or positions by both the first finger mounted indicia 106a and the second finger mounted indicia 106b may be used to trigger a defined function, operation, and/or application. In some implementations, gestures or positions involving only the first finger mounted indicia 106a may be used to trigger a defined function, operation, and/or application. In some implementations, gestures or positions involving only the second finger mounted indicia 106b may be used to trigger a defined function, operation, and/or application, as discussed above. In some implementations, gestures or positions involving three or more fingers mounted indicia 106a, 106b can be detected and recognized, in which the fingers mounted indicia 106a, 106b can be on fingers of one hand or two hands.

Figure 5:
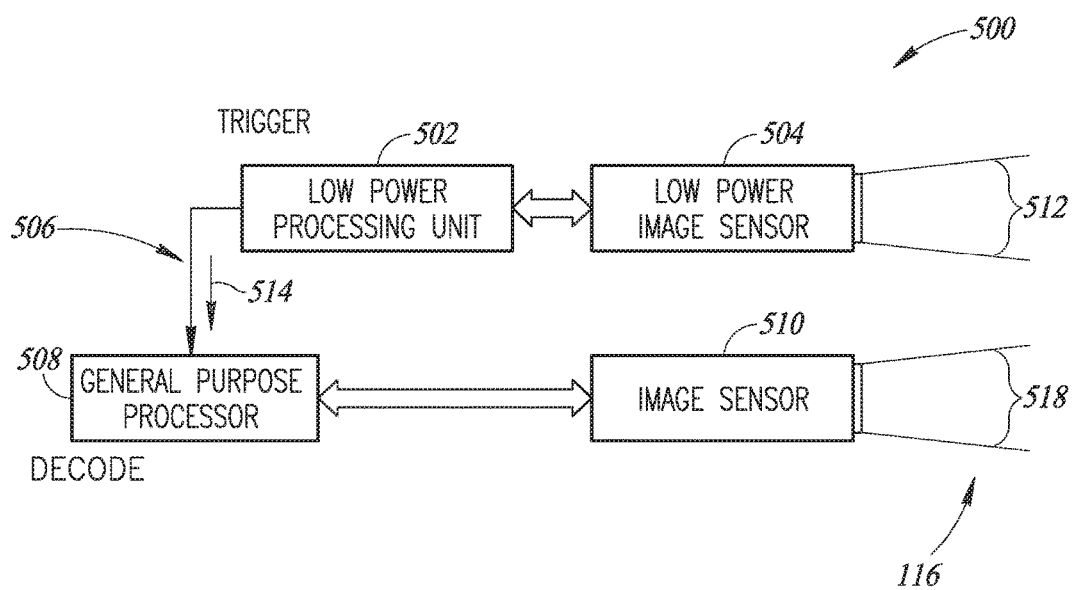
FIG. 5 is a block diagram that shows an ultra-low power processor and ultra-low power imager that may be used to provide a trigger, and a general purpose processor and a second imager used to decode a machine-readable image, according to at least one illustrated implementation.

FIG. 5 shows a system 500 in which a wearable image sensor 104 includes an low power processing unit 502 and low power imager 504 that may be used to generate an activation signal 506, and a general purpose processor 508 and a second imager 510 that may be used to capture a machine-readable symbol 102, according to at least one illustrated implementation. In such an implementation, the at least one image sensor 114 discussed above may be comprised of the low power imager 504 and the second imager 510. In such an implementation, the control system 108 discussed above may include the low power processing unit 502 and the general purpose processor 508. In some implementations, the low power processing unit 502 and the low power imager 504 may be communicatively coupled via, for example, a communications bus. In some implementations, the general purpose processor 508 and the second imager 510 may be communicatively coupled via, for example, a communications bus.

The low power imager 504 may have a first field of view 512 that includes a portion of the surrounding environment 116. In such an implementation, the low power processing unit 502 may maintain the low power imager 504 in an active mode. As such, the low power imager 504 may periodically capture an image from the first field of view 512 to form a set of successive images. In some implementations, for example, the low power imager 504 may capture up to 30 images per second with each image having a QQVGA (Quarter Quarter Video Graphics Array) resolution of about 19200 pixels. The low power imager 504 may operate in a low power mode, and may consume no more than 70 µW of power.

The low power imager 504 may transmit each electronic representation of an image to the low power processing unit 502. In some implementations, the low power processing unit 502 may be comprised of one or more of a field programmable gate array (FPGA), a digital signal processing (DSP) circuit, and a graphics processing unit (GPU). Such a low power processing unit 502 may execute a set of processor executable instructions to detect an occurrence of one or more gestures from the set of captured successive images received from the low power imager 504. In such an implementation, for example, the one or more gestures that may be recognized by the low power processing unit 502 may form part of a gesture recognition policy. Such detection of the one or more gestures may be facilitated and enhanced by the use of a finger mounted indicia 106. Because of the specific application being executed, the low power processing unit 502 may operate with limited resources. When the low power imager 504 detects an occurrence of a gesture, the low power processing unit 502 transmits an activation signal 506 to the general purpose processor 508. In some implementations, the activation signal 506 may include an indication of a function or process associated with the detected gesture, as determined, for example, from the gesture recognition policy.

When the general purpose processor 508 receives the activation signal 506, the general purpose processor 508 may transition from a relative lower power state to a relative higher power state. For example, in some implementations, the general purpose processor 508 may be in a relative lower power state comprised of a sleep mode in which the general purpose processor 508 draws a minimal amount of power. In such an implementation, the activation signal 506 may be comprised of a wake signal 514 that wakes the general purpose processor 508 from the sleep mode to transition to a relative higher power state. In some implementations, the activation signal 506 may indicate a function or process that may be associated with gesture detected by the low power processing unit 502. In such an implementation, the general purpose processor 508 may execute the associated function or process.

In some implementation, the activation signal 506 may include an indication to perform a process or function to capture and/or attempt to decode a machine-readable symbol 102. In such an implementation, the received activation signal 506 may trigger the general purpose processor 508 transition from a relatively lower power consumption state to a relatively higher power consumption state. In some implementations, as part of the transition, the general purpose processor 508 may transmit one or more signals to the second imager 510 that cause the second imager 510 to capture one or more images from within a second field of view 518 of the second imager 510. In other implementations, the activation signal 506 may be received by the second imager 510 from the low power processing unit 502.

The second field of view 518 of the second imager 510 may overlap or be co-extensive with the first field of view 512 of the low power imager 504. The second imager 510 may have a higher picture resolution than the low power imager 504. For example, in some implementations, the second imager 510 may be a charge-coupled device (CCD) that captures images having a resolution of at least 1 megapixel or greater. As such, the second imager 510 may have a relatively higher rated power consumption when capturing images as compared to the low power imager 504, which may have a relatively lower rated power consumption when capturing images. The second imager 510 may transmit the one or more images to the general purpose processor 508.

The general purpose processor 508 may execute one or more processor-executable instructions to detect an occurrence of a machine-readable symbol 102 included within one or more of the images received from the second imager 510. In some implementations, the occurrence of the gesture detected by the low power processing unit 502 may include information, such as location information, regarding a region of interest 120 that may include the machine-readable symbol 102 to be captured and decoded. Such information may advantageously enable the general purpose processor 508 to more quickly and efficiently detect the machine-readable symbol 102 by searching only a subset (e.g., an area associated with the region of interest) of the image(s) received from the second imager 510.

When the general purpose processor 508 detects the machine-readable symbol 102 within the image(s) captured by the second imager 510, the general purpose processor 508 may execute one or more processor-executable instructions to attempt to decode the detected machine-readable symbol 102. Such decoding may be performed, for example, by executing one or more sets of processor-executable instructions that may be included within well-known machine-readable symbol decoding libraries. If the general purpose processor 508 is successful in decoding the machine-readable symbol to obtain the encoded information, the general purpose processor 508 may pass some or all of the decoded information to other processes or functions executed by the general purpose processor 508 or by other processors. When the general purpose processor 508 is finished decoding and processing decoded information, the general purpose processor 508 may transition back to the relative lower power state until receiving another activation signal 506 from the low power processing unit 502. In some situations, the general purpose processor 508 may be unsuccessful in attempting to decode the machine-readable symbol 102. In such a situation, the general purpose processor 508 may transition back to the relative lower power state until receiving another activation signal 506 from the low power processing unit 502.

Figure 6A:
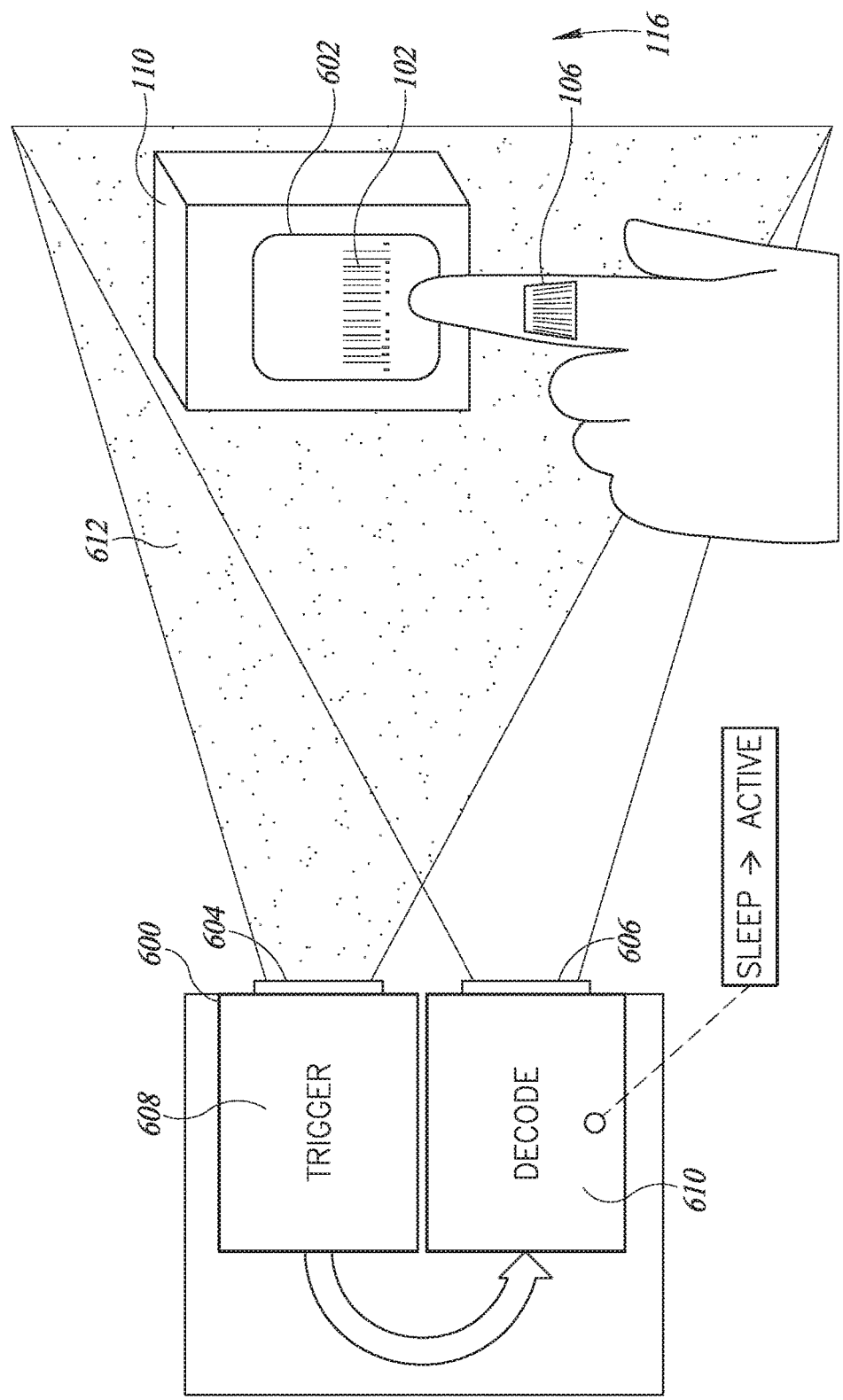
FIG. 6A is a schematic diagram of a processor that detects an occurrence of a gesture within images captured by an ultra-low power imager that triggers the processor to attempt to detect and decode a machine-readable symbol within a field of view of a second imager, according to at least one illustrated implementation.
Figure 6B:
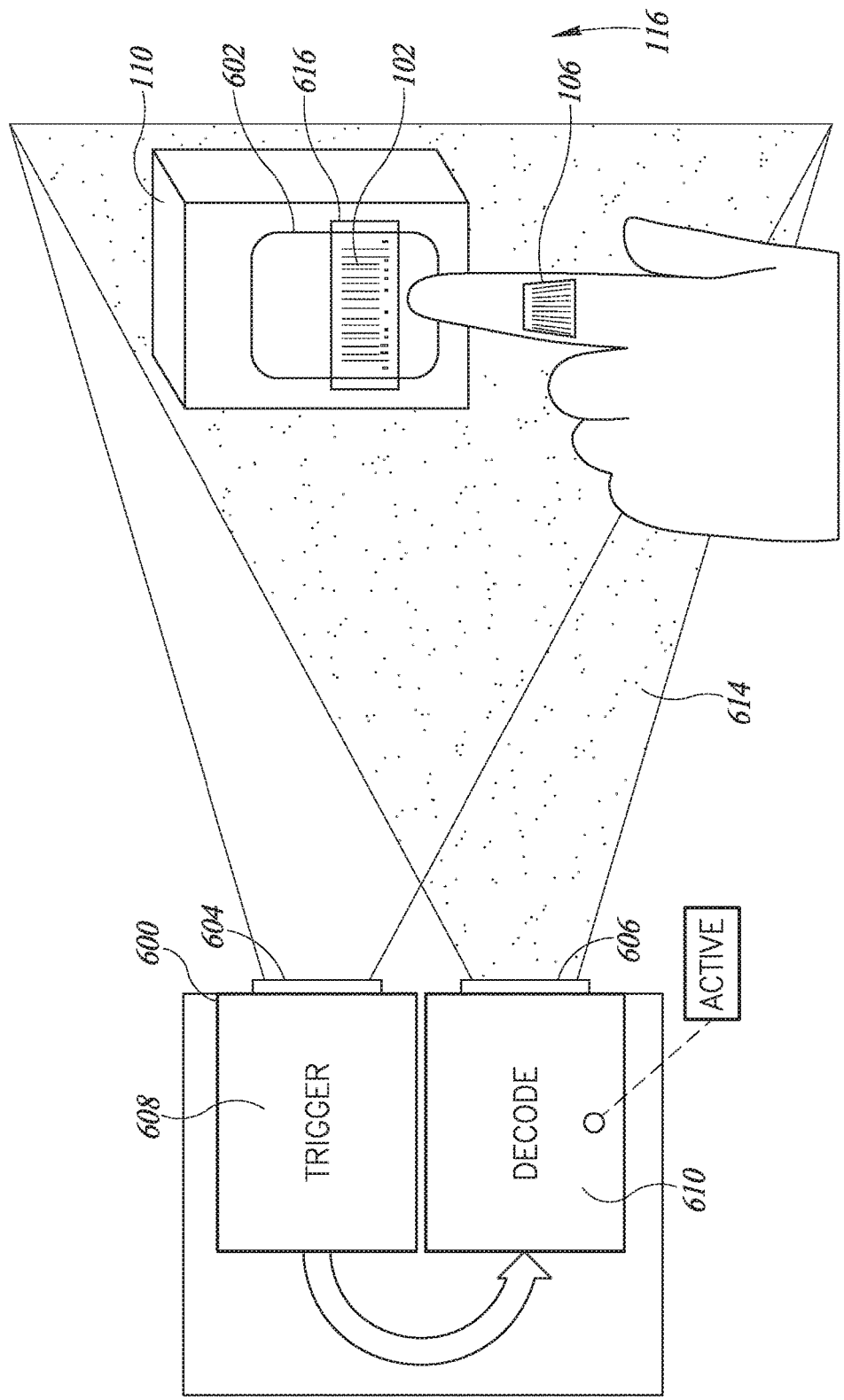
FIG. 6B is a schematic diagram that shows the processor of FIG. 6B in which the processor detects and attempts to decode the machine readable symbol within images captured by a second imager, according to at least one illustrated implementation.

FIGS. 6A and 6B show a processor 600 that detects an occurrence of a gesture by the finger mounted indicia 106 (see gesture trace 602) within images captured by an low power imager 604 that triggers the processor 600 to attempt to detect and decode a machine-readable symbol 102 within images captured by a second imager 606, according to at least one illustrated implementation. The processor 600 may include a trigger function 608 comprised of one or more processor-executable instructions that, when executed, cause the processor 600 to detect the occurrence within images captured by the low power imager 604 of one or more gestures associated with the finger mounted indicia 106. The processor 600 may include a decode function 610 comprised of one or more processor-executable instructions that, when executed, cause the processor 600 to detect and decode within one or more images captured by the second imager 606 the machine-readable symbol 102 that may be borne on an associated object 110.

The low power imager 604 may have a first field of view 612 that includes a portion of the surrounding environment 116. The second imager 606 may have a second field of view 614 that includes a portion of the surrounding environment 116. In some implementations, the first field of view 612 of the low power imager 604 may be coextensive with the second field of view 614 of the second imager 606. When the processor executes the trigger function 608, the processor 600 may maintain the low power imager 604 in an active mode in which the low power imager 604 captures images at a defined rate over time to form a set of successive images. In some implementations, for example, the low power imager 604 may capture up to 30 images per second with each image having a QQVGA (Quarter Quarter Video Graphics Array) resolution of about 19200 pixels, as described above. The processor 600 may search the set of captured images for the occurrence of one or more gestures involving the finger mounted indicia 106. In such a situation, both the processor 600 and the low power imager 604 may draw a minimal amount of power.

When the processor 600 detects an occurrence of a gesture, the processor 600 may execute the one or more instructions from the decode function 610. As such, the processor 600 may transition from a relatively lower power consumption state to a relatively higher power consumption state. As part of the transition, the processor 600 may transmit one or more signals to the second imager 606 that cause the second imager 606 to capture one or more images from within the second field of view 614 of the second imager 606. The second imager 606 may have a higher picture resolution than the low power imager 604, for example, a resolution of at least 1 megapixel or greater. As such, the second imager 606 may have a relatively higher rated power consumption when capturing images as compared to the low power imager 604. The second imager 606 may transmit the one or more images to the processor 600. The processor 600 may execute one or more processor-executable instructions to detect an occurrence of the machine-readable symbol 102 included within the one or more of the images received from the second imager 606. In some implementations, the occurrence of the gesture detected by the processor 600 may be used to determine a region of interest 616 that may include the machine-readable symbol 102 to be captured and decoded.

When the processor 600 detects the machine-readable symbol 102 within the image(s) captured by the second imager 606, the processor 600 may execute one or more processor-executable instructions to attempt to decode the detected machine-readable symbol 102. Such decoding may be performed, for example, by executing one or more sets of processor-executable instructions that may be included within well-known machine-readable symbol decoding libraries. When the processor 600 is finished attempting to decode the captured image of the machine-readable symbol 102, because of either a successful or unsuccessful decode, the processor 600 may end the decode function 610 and transition back to the trigger function 608. In such an implementation, the decode function 610 may be a relatively higher power consumption state, and the trigger function 608 may be a relatively lower power consumption state.

Figure 7A:
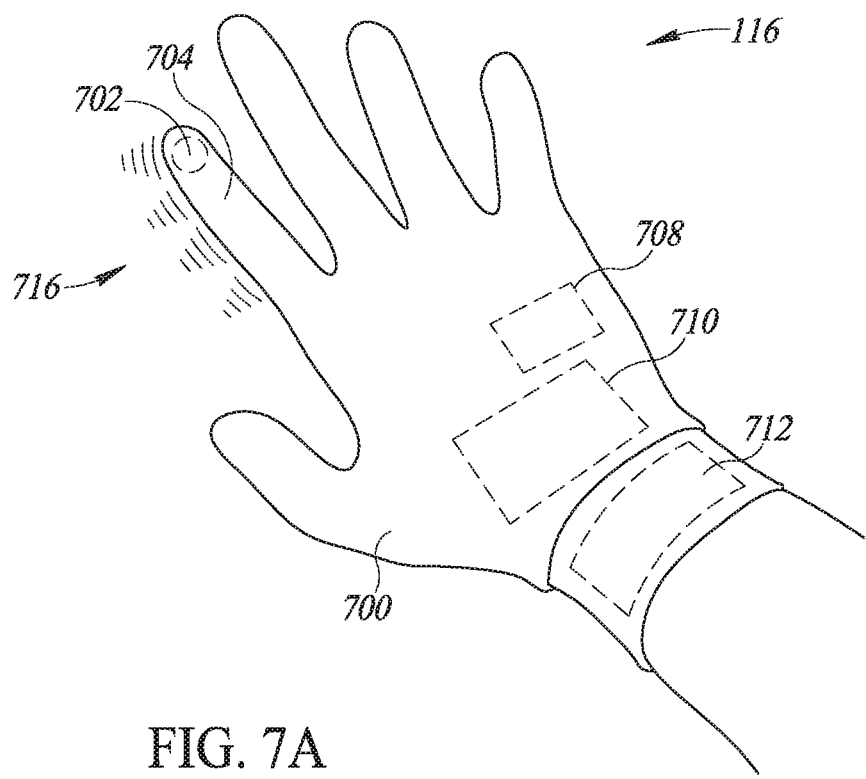
FIG. 7A is a schematic diagram of a glove that includes a first finger mounted indicia on one side of a finger, and a set of one or more light sources on an opposing side of the finger of the glove, according to at least one illustrated implementation.
Figure 7B:
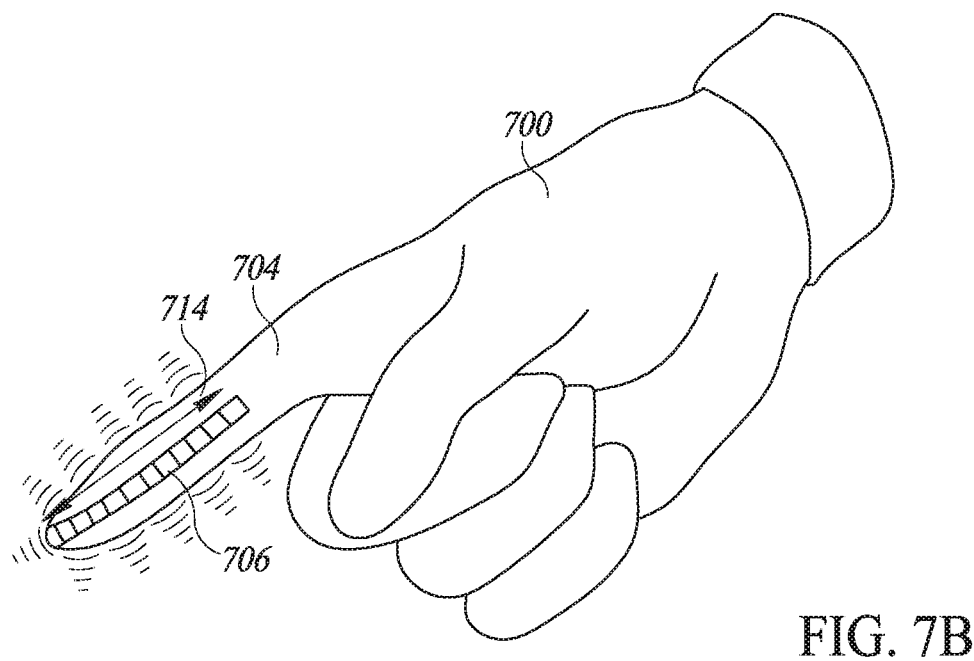
FIG. 7B is a schematic diagram of the one or more light sources on the opposing side of the finger of the glove of FIG. 7A, according to at least one illustrated implementation.

FIGS. 7A and 7B show a glove 700 that includes a first finger mounted indicia 702 on one side of a finger portion 704 of the glove, and a set of one or more light sources 706 on an opposing side of the finger portion 704, according to at least one illustrated implementation. The glove 700 may include a wireless communication module 708, a power supply 710, and a control module 712. In some implementations, the wireless communication module 708 may be communicatively coupled to the wearable image sensor 104 (not shown) using one or more wireless communication protocols, such as Bluetooth, WiFi, ZigBee, or some other wireless communication protocol. The power supply 710 may include a battery, for example, a light-weight or portable battery that may be incorporated into a portion of the glove 700. The control module 712 may include a flexible printed circuit board. Such a control module 712 may be communicatively coupled to the wireless communication module 708 and/or to the light sources 706. In some implementations, the control module 712 may receive one or more control signals via the wireless communication module 708. Based upon the received one or more control signals, the control module 712 may transmit one or more signals to control the operation of the light sources 706. In some implementations, the control module 712 may transmit such one or more signals to turn the light sources 706 ON when the control module 712 detects an instance of a particular gesture performed with the first finger mounted indicia 702.

The light sources 706 may include a set of one or more LEDs that may run along a longitudinal axis 714 that runs from the palm towards the fingertip of the user. The light source 706 may be located along a bottom facing surface (e.g., the surface along the palm) of the finger portion 704 of the glove 700. In some implementations, the light sources 706 may be comprised of other light emitting components. The light sources 706 may be selectively turned ON and turned OFF based upon signals received from the control module 712. Such light sources 706 may be advantageously used to provide an illumination area 716 proximate the finger portion 704 of the glove 700 during periods of little or no ambient lighting. Such an illumination area 716 may be used, for example, to illuminate a machine-readable symbol 102 such that the machine-readable symbol 102 may be detected by the wearable image sensor 104 (not shown).

Figure 8A:
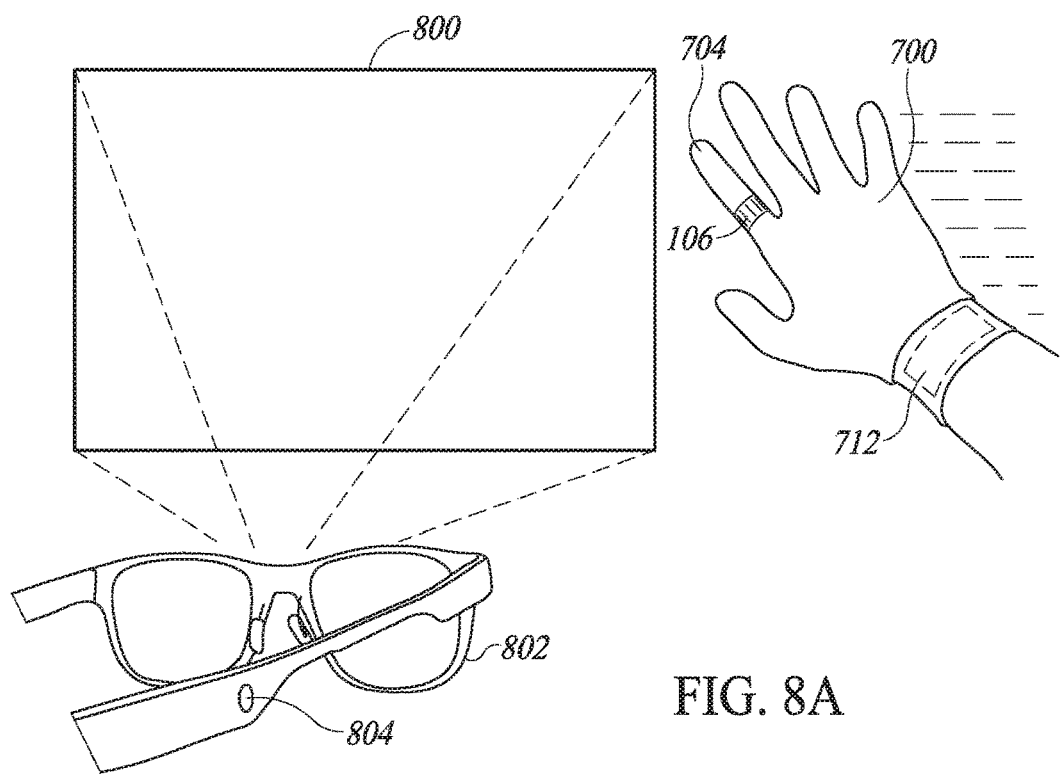
FIG. 8A is a schematic diagram in which the lights sources on the finger portion of the glove of FIGS. 7A and 7B are deactivated when no portion of the glove is within a field of view of a wearable image sensor, according to at least one illustrated implementation.
Figure 8B:
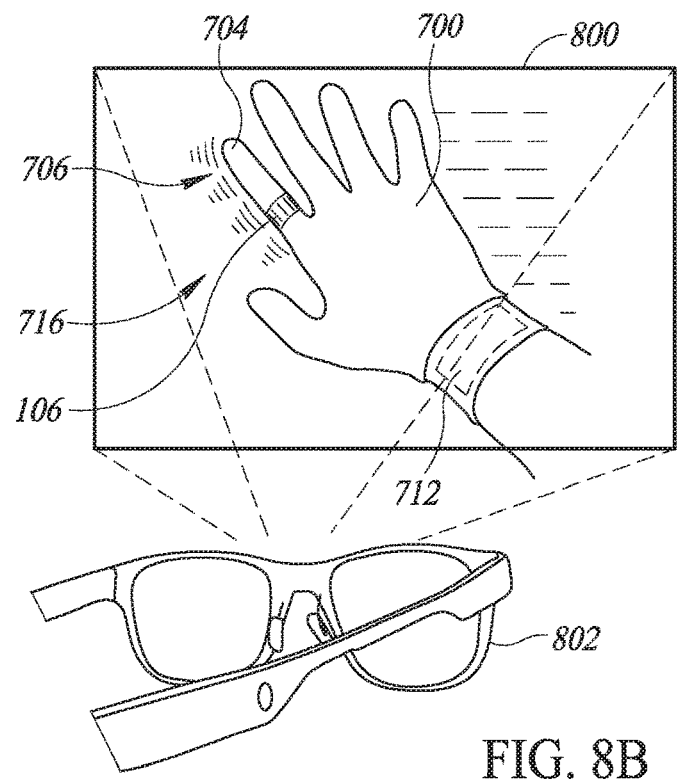
FIG. 8B is a schematic diagram in which the light sources on the finger portion of the glove of FIGS. 7A and 7B are activated when at least a portion of the glove is within the field of view of the wearable image sensor, according to at least one illustrated implementation.

FIGS. 8A and 8B show the lights sources 706 on the finger portion 704 of the glove 700 activated when at least a portion of the glove 700 is within a field of view 800 of the wearable image sensor 802, and deactivated when no portion of the glove 700 is within the field of view 800, according to at least one illustrated implementation. In some implementations, the wearable image sensor 802 may determine the position of the glove 700 based upon one or more indicia borne on the surface of the glove 700. Such indicia may include, for example, one or more finger mounted indicia 106 borne on the surface of the glove 700. As shown in FIG. 8A, no part of the glove 700 is within the field of view 800 of the wearable image sensor 802. As such, the light sources 706 are turned OFF and do not emit any light. As shown in FIG. 8B, the glove 700 has entered the field of view 800 of the wearable image sensor 802. In this situation, the wearable image sensor 104 may detect the glove 700, such as, for example, by detecting the shape of a human, by detecting the finger mounted indicia 106, or by detecting some other shape or feature associated with the glove 700. Once the glove 700 has been detected, the wearable image sensor 104 may transmit one or more signals to the control module 712 on the glove via a wireless communications module 804. Upon receiving these one or more signals, the control module 712 may transmit one or more signals to the light sources 706 that result in the light sources 706 being turned ON to illuminate an illumination area 716. When the glove 700 is no longer within the field of view 800 (because, e.g., the glove 700 has been moved from the field of view 800 or the field of view 800 has changed based on movement of the wearable image sensor 104), then the control module 712 may turn the light sources 706 OFF. Alternatively, or in addition, the light sources 706 may be turned ON and/or OFF based upon one or more detected gestures performed with the finger mounted indicia 106 within the field of view 800 of the wearable image sensor 802.

Figure 9:
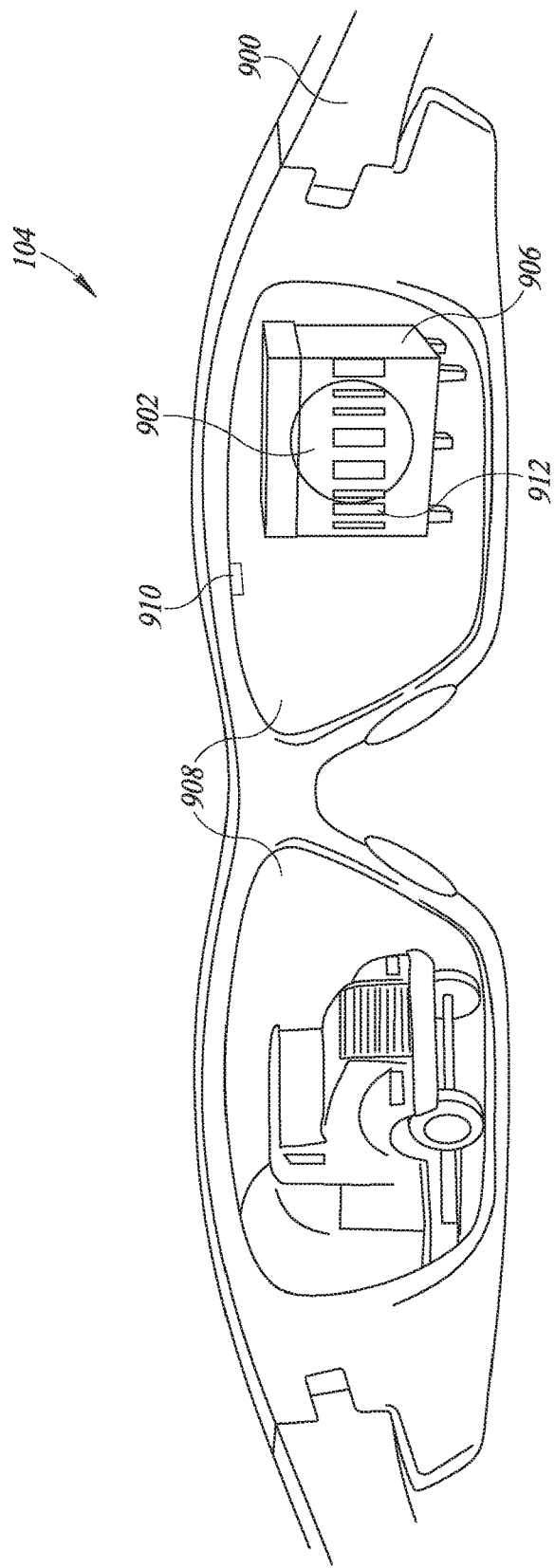
FIG. 9 is a schematic diagram of a wearable augmented reality display that provides a visual indication that is related to an object in an environment surrounding the augmented reality display, according to at least one illustrated implementation.

FIG. 9 shows a wearable image sensor 104 that is a wearable augmented reality display 900 that provides a visual indication 902 related to one or more objects 904 in an environment 906 surrounding the wearable augmented reality display 900, according to at least one illustrated implementation. The wearable augmented reality display 900 may be comprised of a set of glasses with one or more lenses 908, and a light projector 910 that may be used to project light, in the form of shapes or images, onto one or more of the lenses 908. The shape or image projected by the light projector 910 may be responsive to one or more items that may be visible by a user through the lenses 908. In some implementations, for example, the object 904 may bear a machine-readable symbol 912 along one or more surfaces. When the image sensor and/or control system (not shown) on or associated with the wearable augmented reality display 900 detects the machine-readable symbol 912, the light projector 910 may project a symbol comprised of a circle of light of a first color that appears over at least a portion of the machine-readable symbol 912. When the image sensor and/or control system (not shown) on or associated with the wearable image sensor successfully decodes the machine-readable symbol 912, the light projector 910 may project a symbol comprised of a circle of light of a second color that appears over at least a portion of the machine-readable symbol 912. For example, in some implementations, the light projector 910 may project a red circle over the machine-readable symbol 912 when the machine-readable symbol 912 is detected and a green dot over the machine-readable symbol 912 when the machine-readable symbol 912 is decoded.

Figure 10:
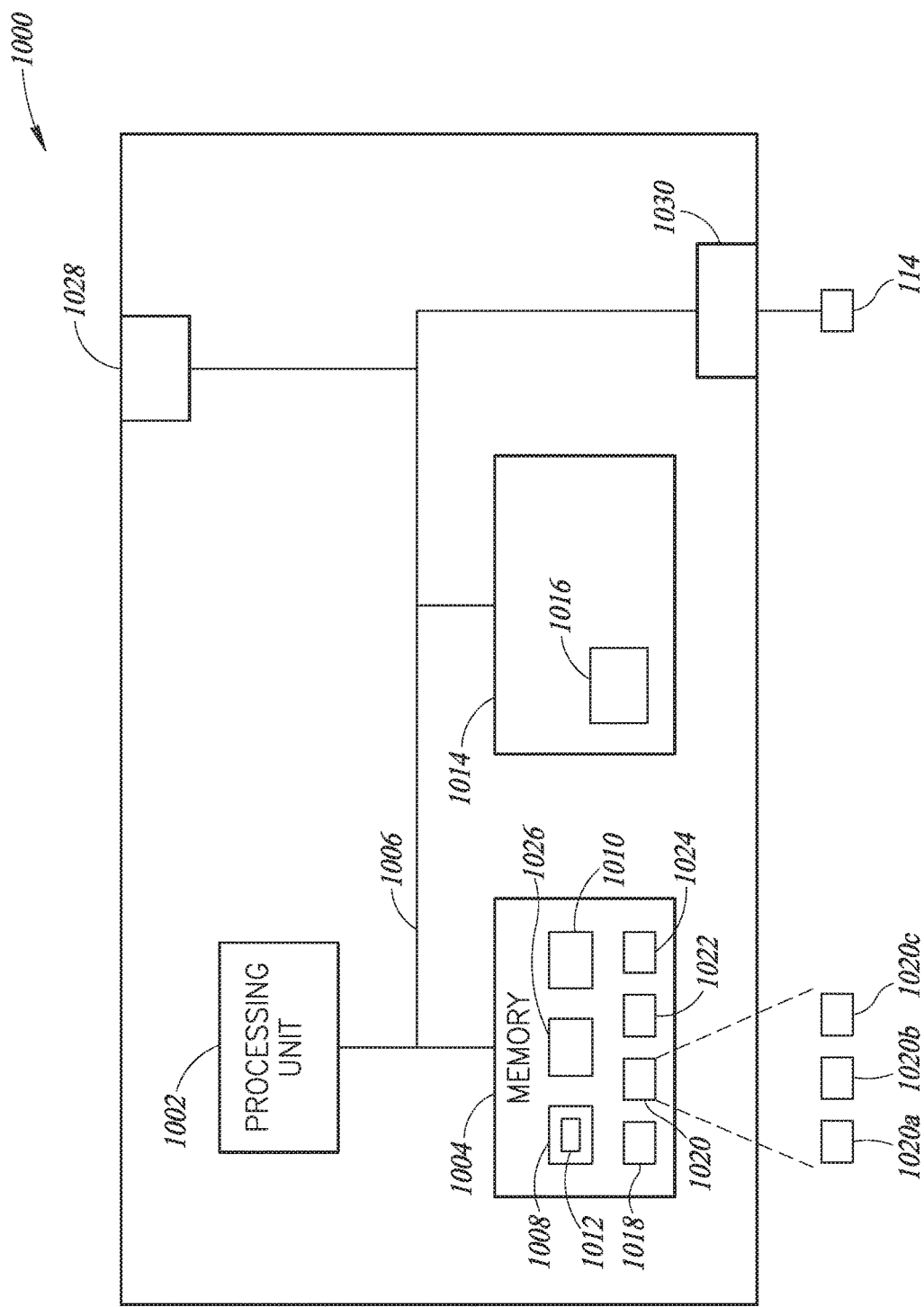
FIG. 10 is a block diagram of a control system that may be used to detect and attempt to decode a captured image of a machine-readable symbol, according to at least one illustrated implementation.

FIG. 10 shows a block diagram of a control system 1000, according to at least one illustrated implementation. Such a control system 1000 may be used as part of, or to implement, one or more of the control system 108 associated with the wearable image sensor 104, for example. The control system 1000 may take the form of any current or future developed computing system capable of executing one or more instruction sets. The control system 1000 includes a processing unit 1002, a system memory 1004 and a system bus 1006 that communicably couples various system components including the system memory 1004 to the processing unit 1002. The control system 1000 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80x86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 1002 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. Unless described otherwise, the construction and operation of the various blocks shown in FIG. 10 are of conventional design. As a result, such blocks need not be described in further detail herein, as they will be understood by those skilled in the relevant art. In some implementations, some or all of the processing unit 1002, the memory 1004, and one or more other components discussed below may be included within a single integrated circuit, such as may occur, for example, with a system on chip (SoC).

The system bus 1006 can employ any known bus structures or architectures, including a memory bus with memory controller, a peripheral bus, and a local bus. The system memory 1004 includes read-only memory ("ROM") 1008 and random access memory ("RAM") 1010. A basic input/output system ("BIOS") 1012, which can form part of the ROM 1008, contains basic routines that help transfer information between elements within the control system 1000, such as during start-up. Some implementations may employ separate buses for data, instructions and power.

The control system 1000 also includes one or more internal nontransitory storage systems 1014. Such internal nontransitory storage systems 1014 may include, but are not limited to, any current or future developed persistent storage device 1016. Such persistent storage devices 1016 may include, without limitation, magnetic storage devices such as hard disc drives, electromagnetic storage devices such as memristors, molecular storage devices, quantum storage devices, electrostatic storage devices such as solid state drives, and the like.

The one or more internal nontransitory storage systems 1014 communicate with the processing unit 1002 via the system bus 1006. The one or more internal nontransitory storage systems 1014 may include interfaces or device controllers (not shown) communicably coupled between nontransitory storage system and the system bus 1006, as is known by those skilled in the relevant art. The nontransitory storage systems 1014 and associated storage devices 1016 provide nonvolatile storage of computer-readable instructions, data structures, program modules and other data for the control system 1000. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 1004, such as an operating system 1018, one or more application programs 1020, other programs or modules 1022, drivers 1024 and program data 1026.

The application programs 1020 may include, for example, one or more machine executable instruction sets (i.e., gesture recognition policy 1020*a*) capable of detecting gestures involving finger mounted indicia 106 in images captured, for example, by the image sensor 114 and/or the ultra-low powered imager 504. The application programs 1020 may include, for example, one or more machine executable instruction sets (i.e., machine-readable code detection 1020*b*) capable of detecting machine-readable symbols 102 that are included within images captured, for example, by the image sensor 114 and/or the second imager 510. The application programs 1020 may include, for example, one or more machine executable instruction sets (machine-readable symbol decoding library 1020*c*) capable of decoding the machine-readable symbols 102 that are included within images captured, for example, by the image sensor 114 and/or the second imager 510. The application programs 1020 may be stored as one or more executable instructions.

In some embodiments, the control system 1000 operates in an environment using one or more of the network interfaces 1028 to optionally communicably couple to one or more remote computers, servers, display devices, via one or more communications channels. These logical connections may facilitate any known method of permitting computers to communicate, such as through one or more LANs and/or WANs. Such networking environments are well known in wired and wireless enterprise-wide computer networks, intranets, extranets, and the Internet.

Further, local communication interface 1030 may be used for establishing communications with other components in a local device, such as may occur, for example, when the control system 1000 is associated with the wearable image sensor 104. For example, the local communication interface 1030 may be used to communicate with the image sensor 114 by transmitting one or more signals to control the operation of the image sensor 114, and by receiving one or more images from the image sensor 114.

Figure 11:
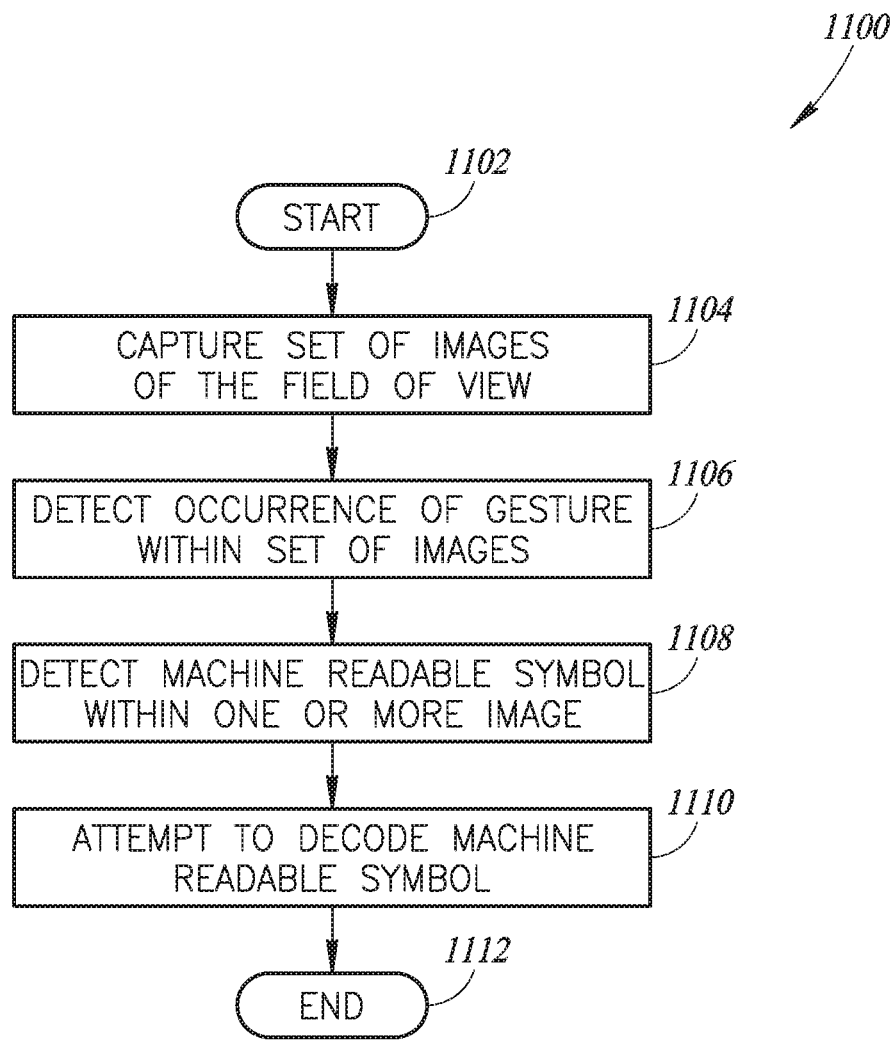
FIG. 11 is a logic flow diagram of a method of detecting and attempting to decode a machine-readable symbol within a set of images, according to at least one illustrated implementation.

FIG. 11 shows a method 1100 that may be used to detect and attempt to decode a machine-readable symbol 102 within a set of images, according to at least one illustrated implementation. The method 1100 starts at 1102, at which a processor enabled device, for example the wearable image sensor 104 and/or control system, activates an imager, such as the image sensor 114 or the ultra-low power image imager 504.

At 1104, the imager may capture a set of images from an associated field of view. The imager may include, for example, the image sensor 114 and/or the ultra-low power image imager 504. The imager may capture images at a defined rate over time such that the set of images may be comprised of a set of successive images. In some implementations, for example, the imager may capture up to 30 images per second with each image having a QQVGA (Quarter Quarter Video Graphics Array) resolution of about 19200 pixels. In such an implementation, the imager that captures the set of images at 1104 may have a relatively low power consumption. In some implementations, the imager may draw no more than 70 µW of power.

At 1106, a processor enabled device, such as the control system 1000, detects an occurrence of a gesture from the set of images captured at 1104. The occurrence of the gesture may be detected based upon the movements of a finger mounted indicia 106 that is within the set of images captured at 1104. The gesture may be represented by a trace of a number of movements as depicted in the set of images. In some implementations, the processor enabled device may implement a gesture recognition policy 1020a to detect an occurrence of a gesture. In such an implementation, the gesture recognition policy 1020a may include one or more gestures and may associate one more movements with each gesture. In some implementations, the gesture recognition policy 1020a may associate one or more functions or processes with each defined gesture. As such, the processor enabled device may cause the associated functions or processes to be executed when the associated gestures is detected.

In some implementations, the detection of an occurrence of a gesture at 1106 may be performed by the low power processing unit 502. As such, the low power processing unit 502 may execute a limited number of processes and/or functions that may be aimed, for example, at detecting an occurrence of a gesture within images captured by the imager, such as the low power imager 504, based upon the movement of an item within the images. In some implementations, such an item may be a hand, a glove, or a finger mounted indicia 106. In such an implementation, the low power processing unit 502 may have a relatively low power consumption. Once the occurrence of the gesture is detected, the method 1100 proceeds to 1108.

At 1108, a processor enabled device, such as the control system 1000, detects the machine-readable symbol 102. In some implementations, such detection may be performed by the general purpose processor 508. In some implementations, the processor enabled device may cause an imager, such as the image sensor 114 and/or the second imager 510, to capture one or more images of a field of view in order to detect the machine-readable symbol 102. In some implementations, the processor enable device may use the image captured at 1104 to detect the machine-readable symbol 102.

The processor enabled device may use one or more functions to search the captured images to detect the machine-readable symbol 102. In some implementations, the processor enabled device may use a pattern recognition function to perform such detection. In some implementations, the processor enabled device may receive information relating to the location of the machine-readable symbol 102 within the field of view. In such an implementation, for example, the occurrence of the gesture detected at 1106 may provide location information regarding a region of interest 120 that includes the machine-readable symbol 102. As such, the region of interest 120 may enable the processor enabled device to more quickly and efficiently detect the machine-readable symbol 102. The method 1100 continues to 1110 when the machine-readable symbol 102 has been detected.

At 1110, a processor enabled device attempts to decode the detected machine-readable symbol 102 within the images captured by the imager. The decoding may be performed, for example, by the general purpose processor 508. In some implementations, the decoding may be performed by executing one or more sets of processor-executable instructions that may be included within well-known machine-readable symbol decoding libraries. If the processor enabled device is successful in decoding the machine-readable symbol to obtain the encoded information, the processor enabled device may pass some or all of the decoded information to other processes or functions executed by the same processor enabled device or by processors in other devices.

At 1112, the method 1100 terminates, for example until invoked again. Alternatively, the method 1100 may repeat continuously or repeatedly, or may execute as multiple instances of a multi-threaded process.

Figure 12:
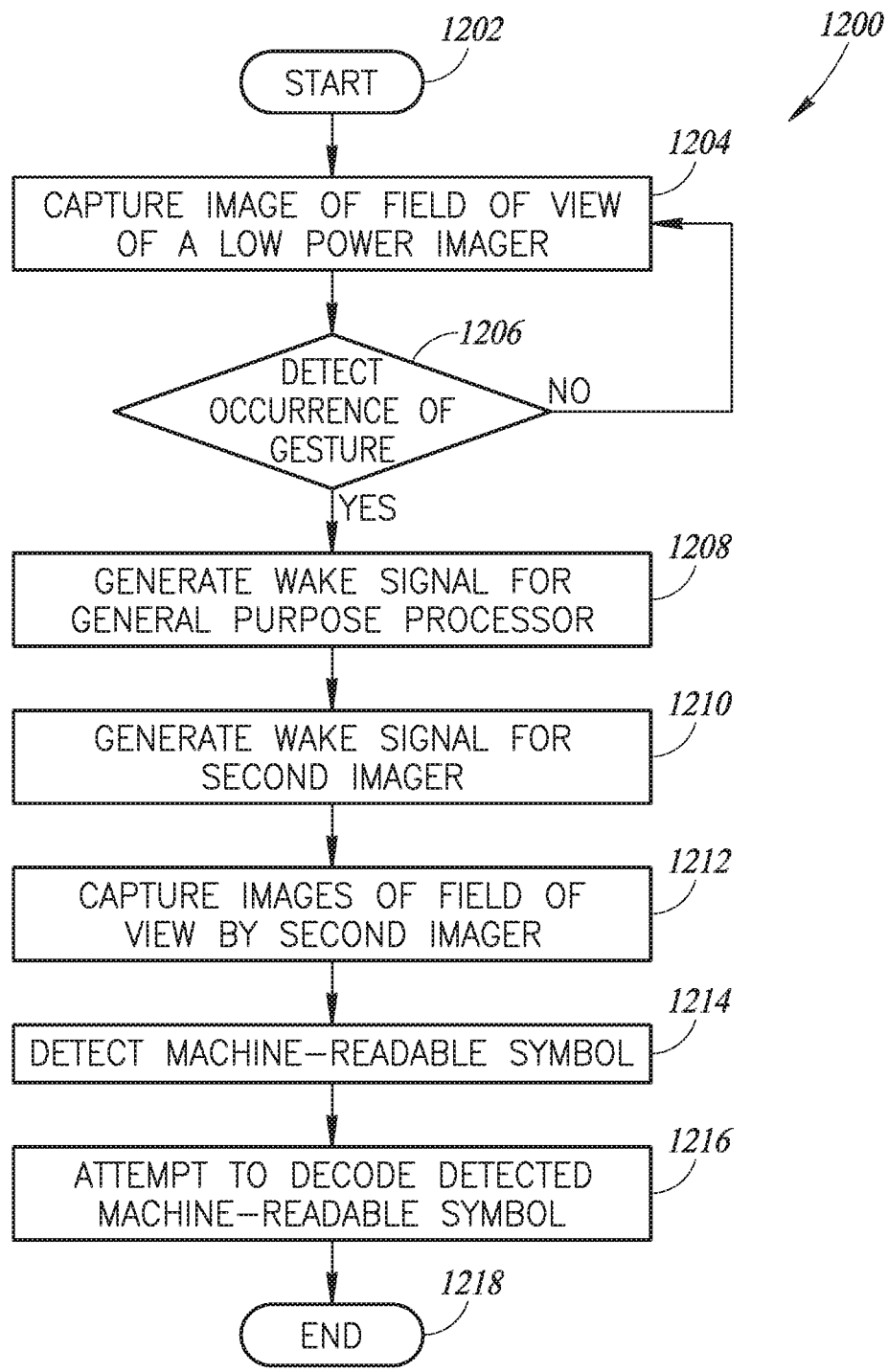
FIG. 12 is a logic flow diagram of a method of capturing a first set of images to detect an occurrence of a gesture, and detecting a machine-readable symbol with in a second set of images, according to at least one illustrated implementation.

FIG. 12 shows a method 1200 that may be used to capture a first set of images to detect an occurrence of a gesture, and detect a machine-readable symbol 102 within a second set of images, according to at least one illustrated implementation. The method 1200 starts at 1202, at which a processor enabled device, for example the wearable image sensor 104 and/or the control system 1000, activates the ultra-low power image imager 504.

At 1204, the ultra-low power image imager 504 may capture an image from a first field of view 512 for the ultra-low power image imager 504. In some implementations, the image captured at 1204 may be part of a series of images captured by the ultra-low power image imager 504. In such instances, the ultra-low power image imager 504 may capture images at a defined rate over time such that the set of images may be comprised of a set of successive images. In some implementations, for example, the ultra-low power image imager 504 may capture up to 30 images per second with each image having a QQVGA (Quarter Quarter Video Graphics Array) resolution of about 19200 pixels. In such an implementation, the ultra-low power image imager 504 that captures the set of images at 1104 may have a relatively low power consumption. In some implementations, the ultra-low power image imager 504 may draw no more than 70 µW of power.

At 1206, the processor enabled device determines if an occurrence of a gesture is detected. In some implementations, detecting the occurrence of a gesture may be performed by an low power processing unit 502 that is part of the processor enabled device. The occurrence of the gesture may be detected based upon the movements of an object, such as, for example, a hand, a glove, and/or finger mounted indicia 106, that is within the set of images captured at 1204. The gesture may be represented by a trace of a number of movements as depicted in the set of images. In some implementations, the processor enabled device may implement a gesture recognition policy 1020a to detect an occurrence of a gesture. In such an implementation, the gesture recognition policy 1020a may include one or more gestures and may associate one more movements with each gesture. In some implementations, the gesture recognition policy 1020a may associate one or more functions or processes with each defined gesture. As such, the processor enabled device may cause the associated functions or processes to be executed when the associated gestures is detected. If a gesture is not detected, the method 1200 may return to 1204 in which the low power imager 504 captures another image. If a gesture is detected, the method 1200 proceeds to 1208.

At 1208, the processor enabled device, such as the low power processing unit 502, generates a wake signal for the general purpose processor 508 once the occurrence of the gesture is detected in 1206. In some implementations, the general purpose processor 508 may be part of the same or of a different processor enabled device that includes the low power processing unit 502. Once the general purpose processor 508 is wakes up, the general purpose processor 508 may begin to execute functions, processes, and/or other processor-executable instructions based upon the gesture that was detected in 1206.

At 1210, a wake signal is generated for the second imager 510. In some implementations, such a wake signal may be generated by the low power processing unit 502 that may detect the occurrence of the gesture at 1206. Such a situation would reduce the amount of time that elapses between the detection of the occurrence of the gesture at 1206 and the detection of the machine-readable symbol 102. As such, the wake signal generated in 1208 for the general purpose processor 508, and the wake signal generated in 1210 for the second imager 510, may occur at or about the same time. Such wake signals may further be transmitted at or about the same time. In some implementations, the wake signal may be generated by the general purpose processor 508 after the general purpose processor 508 receives the wake signal at 1208. After the wake signal is generated and transmitted to the second imager 510, the method 1200 proceeds to 1212.

At 1212, the second imager 510 captures one or more images of the second field of view 518 for the second imager 510. In some implementations, the second field of view 518 of the second imager 510 may overlap or be co-extensive with the first field of view 512 of the low power imager 504. The second imager 510 may have a higher picture resolution than the low power imager 504. For example, in some implementations, the second imager 510 may be a charge-coupled device (CCD) that captures images having a resolution of at least 1 megapixel or greater. As such, the second imager 510 may have a relatively higher rated power consumption when capturing images as compared to the low power imager 504, which may have a relatively lower rated power consumption when capturing images.

At 1214, a processor enable device detects the machine-readable symbol 102. In some implementations, such detection may be performed by the general purpose processor 508. In some implementations, the processor enabled device may cause an imager, such as the image sensor 114 and/or the second imager 510, to capture one or more images of a field of view in order to detect the machine-readable symbol 102. In some implementations, the processor enable device may use the image captured at 1104 to detect the machine-readable symbol 102.

The processor enabled device may use one or more functions to search the captured images to detect the machine-readable symbol 102. In some implementations, the processor enabled device may use a pattern recognition function to perform such detection. In some implementations, the processor enabled device may receive information relating to the location of the machine-readable symbol 102 within the field of view. In such an implementation, for example, the occurrence of the gesture detected at 1106 may provide location information regarding a region of interest 120 that includes the machine-readable symbol 102. As such, the region of interest 120 may enable the processor enabled device to more quickly and efficiently detect the machine-readable symbol 102.

At 1216, a processor enabled device attempts to decode the detected machine-readable symbol 102 within the images captured by the imager. The decoding may be performed, for example, by the general purpose processor 508. In some implementations, the decoding may be performed by executing one or more sets of processor-executable instructions that may be included within well-known machine-readable symbol decoding libraries. If the processor enabled device is successful in decoding the machine-readable symbol to obtain the encoded information, the processor enabled device may pass some or all of the decoded information to other processes or functions executed by the same processor enabled device or by processors in other devices.

At 1218, the method 1200 terminates, for example until invoked again. Alternatively, the method 1200 may repeat continuously or repeatedly, or may execute as multiple instances of a multi-threaded process.

Figure 13:
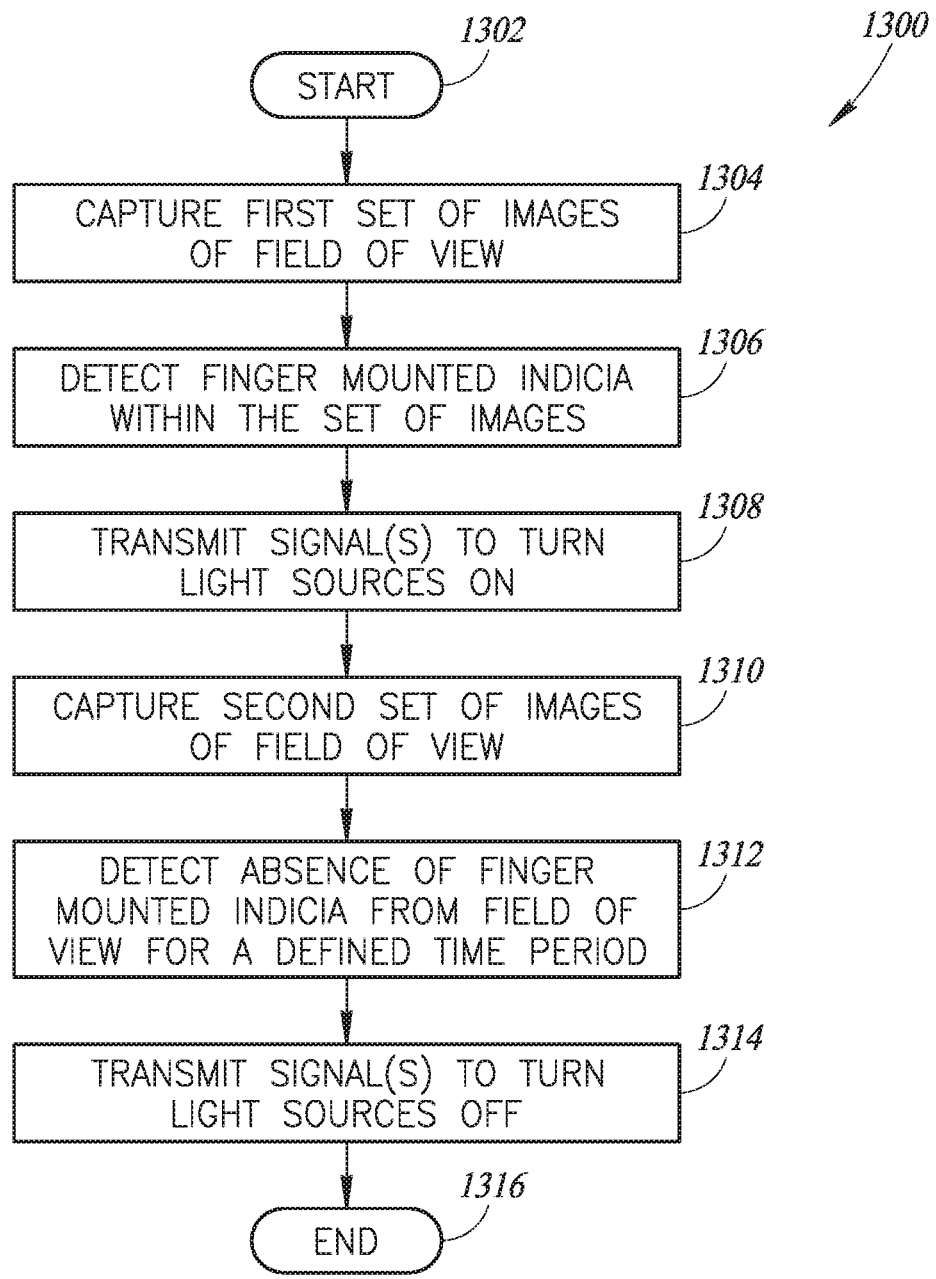
FIG. 13 is a logic flow diagram of a method of controlling a set of light sources based upon a location of a finger mounted indicia relative to a field of view of an image sensor, according to at least one illustrated implementation.

FIG. 13 shows a method 1300 that may be used to control a set of light sources 706 on a glove 700, with such control based upon a location of a finger mounted indicia 106 indicia relative to the field of vision 800 of the wearable image sensor 802, according to at least one illustrated implementation. The method 1300 starts at 1302, at which a processor enabled device, for example the wearable image sensor 104 and/or the control system 1000, activates an imager, such as the image sensor 114 or the ultra-low power image imager 504.

At 1304, the imager may capture a first set of images from an associated field of view. The imager may include, for example, the image sensor 114 and/or the ultra-low power image imager 504. The imager may capture images at a defined rate over time such that the set of images may be comprised of a set of successive images. In some implementations, for example, the imager may capture up to 30 images per second with each image having a QQVGA (Quarter Quarter Video Graphics Array) resolution of about 19200 pixels. In such an implementation, the imager that captures the first set of images at 1304 may have a relatively low power consumption. In some implementations, the imager may draw no more than 70 μW of power.

At 1306, a processor enabled device, such as the wearable image sensor 104 and/or the control system 1000, detects a finger mounted indicia 106 within the first set of images captured at 1304. The finger mounted indicia 106 may include one or more markings, symbols, or other indications that can be detected by the at least one image sensor 114. In some implementations, the detection of the finger mounted indicia 106 may further include the detection of an occurrence of a gesture performed with the finger mounted indicia 106 within the first set of images captured at 1304. The gesture may be represented by a trace of a number of movements as depicted in the set of images. Once the finger mounted indicia 106 is detected, the method 1300 proceeds to 1308.

At 1308, the processor enabled device, such as the wearable image sensor 104 and/or the control system 1000, may generate a signal or signals that cause the light sources 706 on the glove 700 to turn ON, thereby illuminating an area surrounding the light sources 706. In some implementations, the processor enabled device may be communicatively coupled to the glove 700 using, for example, a wireless communications module. In such an implementation, the processor enabled device may include an antenna or other wireless communications transmitter that may be used to transmit the signal generated at 1308 to the glove 700. In some implementations, such a signal may be received by the light sources 706, thereby causing the light sources 706 to turn ON. In some implementations, such a signal may be received by a processor or other control circuit on the glove 700, such as the control module 712, which may generate a second signal that is transmitted to and received by the light sources 706, thereby causing the light sources 706 to turn ON. The method 1300 then proceeds to 1310.

At 1310, the imager may capture a second set of images from the associated field of view. The imager may include, for example, the image sensor 114 and/or the ultra-low power image imager 504. As noted above, the imager may capture images at a defined rate over time such that the set of images may be comprised of a set of successive images. In some implementations, for example, the imager may capture up to 30 images per second with each image having a QQVGA (Quarter Quarter Video Graphics Array) resolution of about 19200 pixels. In such an implementation, the imager that captures the second set of images at 1310 may have a relatively low power consumption. In some implementations, the imager may draw no more than 70 µW of power. The second set of images may be captured at a later point in time than the first set of images captured in 1304.

At 1312, a processor enabled device, such as the wearable image sensor 104 and/or the control system 1000, detects that the finger mounted indicia 106 is absent from the second set of images captured at 1310. The finger mounted indicia 106 may include one or more markings, symbols, or other indications that can be detected by the at least one image sensor 114. In some implementations, such detection of the absence of the finger mounted indicia 106 may include a time component such that the finger mounted indicia 106 is absent from the field of view as captured within the second set of images for a defined period of time, such as, for example, one-half second, one second, or more. Such a time component may, for example, minimize flickering or other flashes of the light sources 706 when the finger mounted indicia 106 is near the edges of the field of view. Once the absence of the finger mounted indicia 106 is detected, the method 1300 proceeds to 1314.

At 1314, the processor enabled device, such as the wearable image sensor 104 and/or the control system 1000, may generate a signal or signals that cause the light sources 706 on the glove 700 to turn OFF. In some implementations, such a signal may be received by the light sources 706, thereby causing the light sources 706 to turn OFF. In some implementations, such a signal may be received by a processor or other control circuit on the glove 700, such as the control module 712, which may generate a second signal that is transmitted to and received by the light sources 706, thereby causing the light sources 706 to turn OFF. The method 1300 then proceeds to 1316.

At 1316, the method 1300 terminates, for example until invoked again.

Alternatively, the method 1300 may repeat continuously or repeatedly, or may execute as multiple instances of a multi-threaded process.

Figure 14:
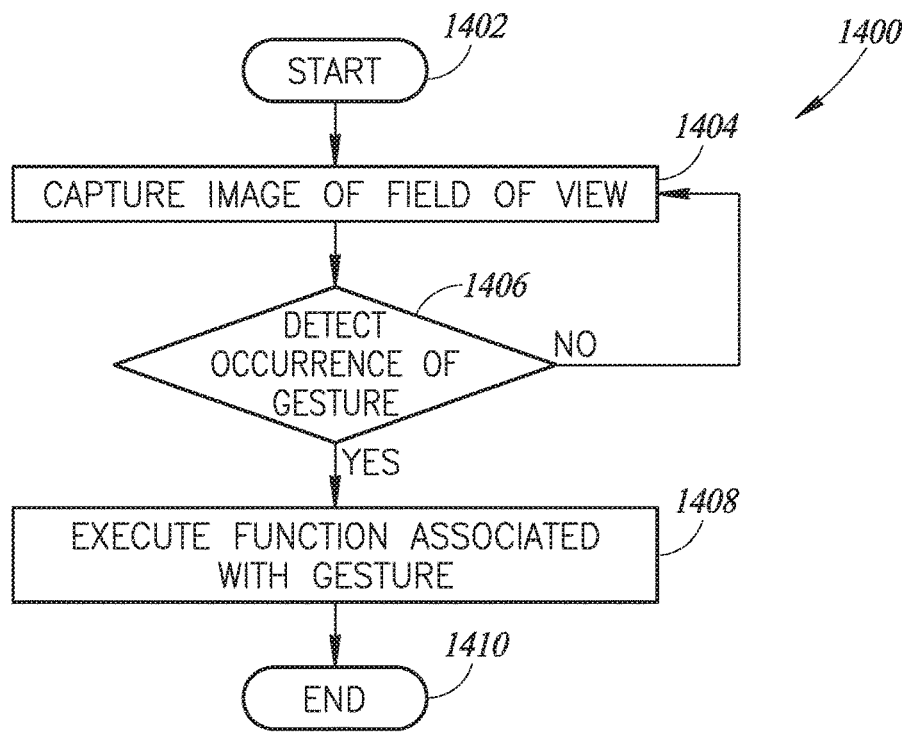
FIG. 14 is a logic flow diagram of a method of detecting an occurrence of a gesture and executing a function associated with the detected gesture, according to at least one illustrated implementation.

FIG. 14 shows a method 1400 that may be used to detect an occurrence of a gesture and execute a function associated with the detected gesture, according to at least one illustrated implementation. The method 1400 starts at 1402, at which a processor enabled device, for example the wearable image sensor 104 and/or the control system 1000, activates an imager, such as the image sensor 114 or the ultra-low power image imager 504.

At 1404, the imager may capture an image from an associated field of view. In some implementations, the image captured at 1404 may be part of a series of images captured by the imager. In such instances, the imager may capture images at a defined rate over time such that the set of images may be comprised of a set of successive images. In some implementations, for example, the imager may capture up to 30 images per second with each image having a QQVGA (Quarter Quarter Video Graphics Array) resolution of about 19200 pixels. In such an implementation, the imager that captures the set of images at 1404 may have a relatively low power consumption. In some implementations, for example, the imager may draw no more than 70 µW of power.

At 1406, the processor enabled device determines if an occurrence of a gesture is detected. In some implementations, detecting the occurrence of a gesture may be performed by a low power processing unit 502 that is part of the processor enabled device. The occurrence of the gesture may be detected based upon the movements of an object, such as, for example, a hand, a glove, and/or finger mounted indicia 106, that is within the set of images captured at 1404. The gesture may be represented by a trace of a number of movements as depicted in the set of images. In some implementations, the processor enabled device may implement a gesture recognition policy 1020a to detect an occurrence of a gesture. In such an implementation, the gesture recognition policy 1020a may include one or more gestures and may associate one more movements with each gesture. In some implementations, the gesture recognition policy 1020a may associate one or more functions or processes with each defined gesture. As such, the processor enabled device may cause the associated functions or processes to be executed when the associated gestures is detected. If a gesture is not detected, the method 1400 may return to 1404 in which the imager captures another image. If a gesture is detected, the method 1400 proceeds to 1408. At 1408, the processor enabled device executes the function or process associated with the gesture detected at 1406. Such functions may include, for example, identifying a region of interest in which to search for a machine-readable symbol 102; adding a representation of an object 110 associated with a detected machine-readable symbol 102 to a virtual basket; removing a representation of an object 110 associated with a detected machine-readable symbol 102 from a virtual basket; requesting information regarding an object 110 associated with a detected machine-readable symbol 102; defining a remote host to transmit captured, detected, and/or decoded information; and/or an additional, separate gesture to identify a communication channel (e.g., Bluetooth, WiFi, ZigBee). Each of these functions may be associated with a separate gesture within the set of gestures. The set of gestures may be used to form a gesture recognition policy that may be executed by the control system 108. Once the function is executed, the method 1400 proceeds to 1410.

At 1410, the method 1400 terminates, for example until invoked again.

Alternatively, the method 1400 may repeat continuously or repeatedly, or may execute as multiple instances of a multi-threaded process.

Figure 15:
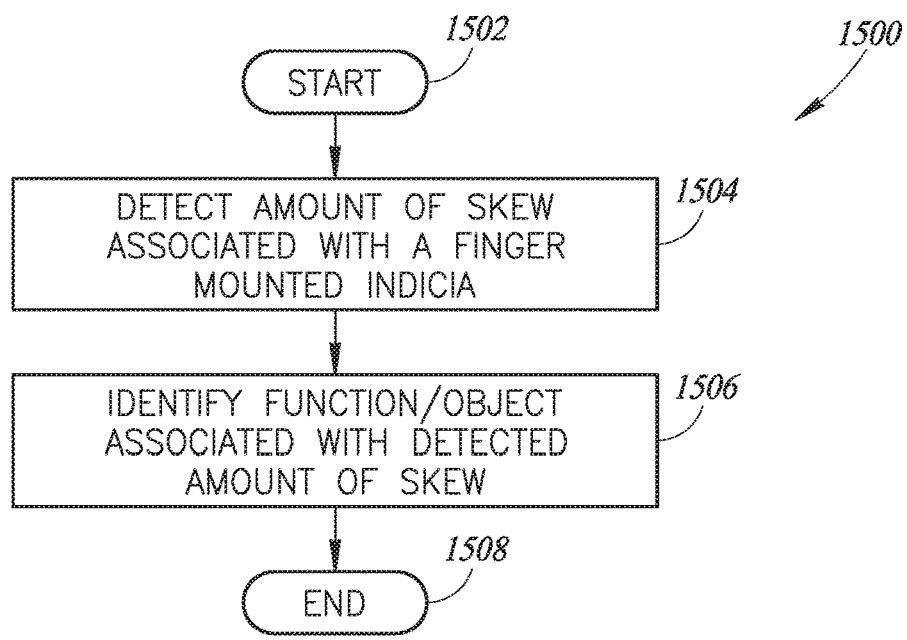
FIG. 15 is a logic flow diagram of a method of identifying a function or object based upon an amount of skew detected for a finger mounted indicia, according to at least one illustrated implementation.

FIG. 15 shows a method 1500 that may be used to identify a function or object based upon an amount of skew detected for a finger mounted indicia 106 that includes a machine-readable barcode symbol 302, according to at least one illustrated implementation. The method 1500 starts at 1502, at which a processor-based device, for example the wearable image sensor 104 and/or the control system 1000, activates an imager, such as the image sensor 114, the ultra-low power image imager 504, and/or the second imager 510.

At 1504, the processor enabled device detects an amount of skew associated with the finger mounted indicia 106. The amount skew of the machine-readable barcode symbol 302 may be determined based upon one or more perceived distances 308 between associated adjacent bars 310 in the machine-readable barcode symbol 302. For example, when the finger portion 306 of the glove 300 is in a relatively vertical direction a first amount of skew 312 may be perceived by the control system 108, and when the finger portion 306 of the glove 300 is in a relatively horizontal direction, a second amount of skew 314 may be perceived by the control system 108. In such situations, the perceived distance 308 between associated adjacent bars 310 may be relatively greater when the finger portion 306 is in a relatively vertical direction to create the first amount of skew 312 as compared to the same perceived distance 308 between the same associated adjacent bars 310 when the finger portion 306 is in a relatively horizontal direction to create the second amount of skew.

At 1506, the processor enabled device identifies an object and/or function associated with the detected amount of skew from 1504. For example, in some implementations, the processor enabled device may detect and decode a first machine-readable symbol 102 located on a proximal object 110 when the processor enabled device detects a first amount of skew (e.g., when the finger portion is oriented in the relatively vertical direction), and the processor enabled device may detect and decode a second machine-readable symbol 102 located on a distal object 110 when the processor enabled device detects a second amount of skew (e.g., when the finger portion 306 is oriented in the relatively horizontal direction). In another situation, for example, in implementations in which the user is wearing an augmented or virtual reality headset (not shown), the relative amount of detected and determined skew may be used to control an amount of zooming capability provided by the augmented or virtual reality headsets. As such, the control system 108 may transmit one or more signals to cause the zoom function to zoom out when the control system 108 detects a first amount of skew 312, and the control system 108 may transmit one or more signals to cause the zoom function to zoom in when the control system 108 detects a second amount of skew 314. In some implementations, the detected and determined amount of skew may be used to control the functions of objects that are spaced apart from the user. For example, in some implementations, the relative amount of detected and determined skew may be used to control a speed and/or direction of a remotely controlled vehicle. As such, the processor enabled device may transmit one or more signals to cause the remotely controlled vehicle may decelerate (or turn right) when the processor enabled device detects a first amount of skew, and the processor enabled device may transmit one or more signals to cause the remotely controlled vehicle may accelerate (or turn left) when the processor enabled device detects a second amount of skew.

At 1508, the method 1500 terminates, for example until invoked again. Alternatively, the method 1500 may repeat continuously or repeatedly, or may execute as multiple instances of a multi-threaded process.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified. The various embodiments described above can be combined to provide further embodiments. In addition, U.S. Pat. No. 9,349,047, entitled "Method for the Optical Identification of Objects in Motion," is incorporated herein by reference, in its entirety.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

Accordingly, the claims are not limited by the disclosure.

The invention claimed is:

1. A system that reads machine-readable symbols, comprising:
   at least one wearable image sensor having a field of view, the field of view moveable to selectively encompass respective portions of an environment with movement of the at least image sensor, the at least one image sensor which in operation captures images of the respective portions of the environment within the field of view of the at least one image sensor;
   a control system that is communicatively coupled to the at least one image sensor to receive signals representative of the images, the control system configured to:
   detect the first finger mounted indicia and an occurrence of a one of a plurality of gestures in the images; and
   determine which of a plurality of defined functions is indicated by the detected gesture based at least in part on the determined shape of a trace of the first finger mounted indicia in the images;
   execute respective ones of each of a plurality of defined functions in response to successive ones of a plurality of gestures detected in the images, including in response to detection of the occurrence of a first gesture, trigger an at least attempt at decoding one or more machine-readable symbols represented in the images.

2. The system of claim 1 wherein the control system includes a first processor and at least a second processor, the first processor having a lower rated power consumption than a rated power consumption of the second processor, and to trigger an at least attempt at decoding one or more machine-readable symbols represented in the images the first processor provides an activation signal to activate the second processor.

3. The system of claim 2 wherein to activate the second processor, the first processor provides a wake signal that wakes the second processor from a relative lower power state to a relatively higher power state.

4. The system of claim 2 wherein the at least one image sensor includes a first image sensor and a second image sensor, the first image sensor having a lower rated power consumption than a rated power consumption of the second processor, and to trigger an at least attempt at decoding one or more machine-readable symbols represented in the images the first processor provides a signal that activates the second image sensor to capture images of the portion of the environment.

5. The system of claim 4 wherein a respective field of view of the second image sensor is co-extensive with a respective field of view of the first image sensor.

6. The system of claim 1 further comprising:
at least one light source, and wherein in response to detection of the occurrence of the first gesture, the control system causes the at least one light source to emit illumination.

7. The system of claim 1 wherein in triggering an at least attempt at decoding the control system triggers a transition from a relatively lower power consumption state to a relatively higher power consumption state, and after an attempted decode the control system triggers a return to the relatively lower power state.

8. The system of claim 1 wherein the first finger mounted indicia is a first finger mounted machine-readable symbol.

9. The system of claim 1 wherein the first finger mounted indicia is a first finger mounted one-dimensional machine-readable symbol.

10. The system of claim 9 wherein the control system is further configured to detect an amount of skew along a longitudinal axis of the first finger mounted one-dimensional machine-readable symbol in the images.

11. The system of claim 1 wherein the first finger mounted indicia is at least a first finger mounted indicia that does not encode information.

12. The system of claim 1 wherein the control system is further configured to:
detect an occurrence of a second gesture in the images, the second gesture represented by a trace of a number of movements of a second finger mounted indicia; and
determine which of the plurality of defined functions is indicated by the gesture based at least in part on one of the determined shape of the trace of the first finger mounted indicia or the determined shape of the trace of the second finger mounted indicia in the images.

13. The system of claim 12 wherein the control system is configured to determine which of the plurality of defined functions is indicated by the gesture based at least in part on the determined shape of the trace of the first finger mounted indicia in combination with the determined shape of the trace of the second finger mounted indicia in the images.

14. The system of claim 1 wherein the control system is further configured to:
in response to detection of the occurrence of the first gesture, search a region of interest for one or more machine-readable symbols, the region of interest which is within the field of view of the at least one wearable image sensor.

15. The system of claim 1 wherein the control system includes at least one processor and at least one non-transitory processor-readable storage medium that stores at least one of processor-executable instructions or data that, when executed by the at least one processor, cause the at least one processor to perform the plurality of defined functions.

16. The system of claim 1 wherein the plurality of defined functions includes adding a representation of an object associated with a detected machine-readable symbol to a virtual basket or removing the representation of the object associated with the detected machine-readable symbol from the virtual basket.

17. The system of claim 16 wherein the plurality of defined functions includes requesting information regarding an object associated with a detected machine-readable symbol.

18. The system of claim 1 wherein the plurality of defined functions includes defining a remote host to transmit captured, detected, and/or decoded information.

19. A system that reads machine-readable symbols, comprising:
at least one wearable image sensor having a field of view, the field of view moveable to selectively encompass respective portions of an environment with movement of the at least image sensor, the at least one image sensor which in operation captures images of the respective portions of the environment within the field of view of the at least one image sensor;
a control system that is communicatively coupled to the at least one image sensor to receive signals representative of the images, the control system configured to:
detect an occurrence of a first gesture in the images, the first gesture represented by a trace of a number of movements of a first finger mounted indicia; and
in response to detection of the occurrence of the first gesture, trigger an at least attempt at decoding one or more machine-readable symbols represented in the images,
wherein the first finger mounted indicia is a first finger mounted non-perceptible digital watermark that is not perceptible by a human, and the at least one of processor-executable instructions or data, when executed by the at least one processor, cause the at least one processor to: detect the first finger mounted non-perceptible digital watermark in the images.

20. A system of that reads machine-readable symbols, comprising:
at least one wearable image sensor having a field of view, the field of view moveable to selectively encompass respective portions of an environment with movement of the at least image sensor, the at least one image sensor which in operation captures images of the respective portions of the environment within the field of view of the at least one image sensor;
a control system that is communicatively coupled to the at least one image sensor to receive signals representative of the images, the control system configured to:
detects an occurrence of a first gesture in the images, the first gesture represented by a trace of a number of movements of a first finger mounted indicia; and
in response to detection of the occurrence of the first gesture, triggers an at least attempt at decoding one or more machine-readable symbols represented in the images,
wherein the first finger mounted indicia is at least a first finger mounted light source or at least a first finger mounted retro-reflector, and the at least one of processor-executable instructions or data, when executed by the at least one processor, cause the at least one processor to: detect the first finger mounted light source or the first finger mounted retro-reflector in the images.

* * * * *